United States Patent
Seki

(10) Patent No.: US 6,737,790 B2
(45) Date of Patent: May 18, 2004

(54) IMAGE FORMING APPARATUS HAVING A HEAT INSULATING MEMBER

(75) Inventor: Junichi Seki, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/311,885

(22) Filed: May 14, 1999

(65) Prior Publication Data

US 2002/0125803 A1 Sep. 12, 2002

(30) Foreign Application Priority Data

May 19, 1998 (JP) .......................... 10-136693

(51) Int. Cl.[7] .................................. H01J 7/24
(52) U.S. Cl. ............................ 313/47; 313/44; 313/46; 313/495; 313/496; 165/104.33; 165/104.34; 349/161
(58) Field of Search ................. 349/121, 161; 313/17, 495, 496, 483, 44, 46, 47, 582–587, 497, 27, 24; 165/104.33, 104.34

(56) References Cited

U.S. PATENT DOCUMENTS

| | | | | |
|---|---|---|---|---|
| 4,771,277 A | * | 9/1988 | Barbee et al. | 345/173 |
| 4,785,217 A | * | 11/1988 | Matsuda et al. | 313/479 |
| 5,293,262 A | * | 3/1994 | Adachi et al. | 349/149 |
| 5,565,934 A | * | 10/1996 | Boudreau et al. | 348/818 |
| 5,677,746 A | * | 10/1997 | Yano | 349/58 |
| 5,757,443 A | * | 5/1998 | Kobayashi | 349/122 |
| 5,831,382 A | * | 11/1998 | Bilan et al. | 313/495 |
| 5,869,919 A | * | 2/1999 | Sato et al. | 313/17 |
| 6,172,457 B1 | * | 1/2001 | Brown et al. | 313/496 |
| 6,198,222 B1 | * | 3/2001 | Chang | 313/46 |
| 6,288,489 B1 | * | 9/2001 | Isohata et al. | 313/46 |

FOREIGN PATENT DOCUMENTS

| | | | |
|---|---|---|---|
| JP | 51-23159 | 2/1976 | |
| JP | 3-196782 | 8/1991 | |
| JP | 4-110989 | 4/1992 | |
| JP | 7-235255 | 9/1995 | |
| JP | 8-55567 | 2/1996 | |
| JP | 8-179836 | 7/1996 | |
| JP | 9-27287 | 1/1997 | |
| JP | 9-027286 | 1/1997 | |
| JP | 9-129163 | 5/1997 | |
| JP | 9-199066 | 7/1997 | |
| JP | 9-320496 | 12/1997 | |
| JP | 11119666 A | * 4/1999 | G09F/9/00 |

* cited by examiner

Primary Examiner—Nimeshkumar D. Patel
Assistant Examiner—Sikha Roy
(74) Attorney, Agent, or Firm—Fitzpatrick, Cella, Harper & Scinto

(57) ABSTRACT

An image forming apparatus includes an envelope formed by first and second substrates disposed at a predetermined distance therebetween and an image forming member disposed in the envelope. A heat insulating member is disposed on a surface of the envelope in an area excepting partial surface areas of the first and second substrates.

12 Claims, 22 Drawing Sheets

+Z ← → −Z

IMAGE FORMING APPARATUS HAVING A HEAT INSULATING MEMBER

BACKGROUND OF THE INVENTION

1. Field of the Invention

The present invention relates to an image forming apparatus.

2. Related Background Art

Flat panel image forming apparatuses, typically plasma display and liquid crystal display, are now being developed to make them thin and light in weight. A means for cooling an image display panel of such image forming apparatuses of high output and high precision has been proposed in order to prevent shortening element life due to a slow leak through a crack which would be formed without cooling, and deformation of the panel to be caused by thermal strain and to prevent a shortened lifetime to be caused by a temperature rise.

For example, as shown in FIG. 21, in the publication of JP-A-03-196782, a heatsink plate 51 having a fin structure is mounted on the back of an image display panel 10 in order to cool the back.

As shown in FIGS. 22A and 22B, in the publication of JP-A-08-179836, a metal pipe 61 is mounted on the back of an image display panel 10 and liquid cooled with an air fan 63 and a heatsink 62 is flowed in the metal pipe.

Also as shown in FIG. 23, in the publication of JP-A-08-055567, air blown from a fan 71 mounted on the back of a housing 72 is guided into the inside of the housing 72 along an image display panel 10 to the front side thereof, in order to cool the entire panel 10.

The above-described conventional techniques are found, however, not satisfactory, because the cooling system becomes bulky as the screen size becomes large and because the depth size and consumption power of the apparatus increase.

SUMMARY OF THE INVENTION

It is an object of the present invention to provide an image forming apparatus having the structure capable of efficiently dissipating heat not suitable for the apparatus.

It is another object of the present invention to provide an image forming apparatus having the structure capable of making uniform the distribution of temperature in the entire envelope (display panel) as much as possible.

It is another object of the present invention to provide an image forming apparatus capable of forming an image having a higher quality.

In order to achieve the above objects of the invention, there is provided an image forming apparatus which has an envelope formed by first and second substrates disposed at a predetermined distance therebetween and image forming means disposed in the envelope, wherein a heat insulating member is disposed on a surface of the envelope in an area excepting partial surface areas of the first and second substrates.

DETAILED DESCRIPTION OF THE PREFERRED EMBODIMENTS

An image forming apparatus of this invention has an envelope formed by first and second substrates disposed at a predetermined distance therebetween and image forming means disposed in the envelope, wherein a heat insulating member is disposed on a surface of the envelope in an area excepting partial surface areas of the first and second substrates.

The image forming apparatus of this invention includes, for example, a liquid crystal display panel, a plasma display panel, an electron beam display panel, and the like. These image forming apparatus have image forming means disposed in its envelope.

For example, the image forming means of an electron beam display panel includes electron emitting elements and an image forming member which forms an image when electrons from the electron emitting element are applied. The image forming member is constituted of, for example, an electrode for accelerating electrons and a light emitting member for emitting light when electrons are applied.

The envelope of an electron beam display panel is constituted of, for example, first and second substrates disposed at a predetermined distance therebetween, the first substrate being provided with electron emitting elements and the second substrate being provided with the image forming member.

The heat insulating member of the invention may be disposed directly on the side of the envelope or may be held by the housing which supports the envelope and disposed on the side of the envelope in contact with the envelope.

The image forming apparatus of the invention will be described more specifically with reference to preferred configurations of an embodiment.

Figure 1:
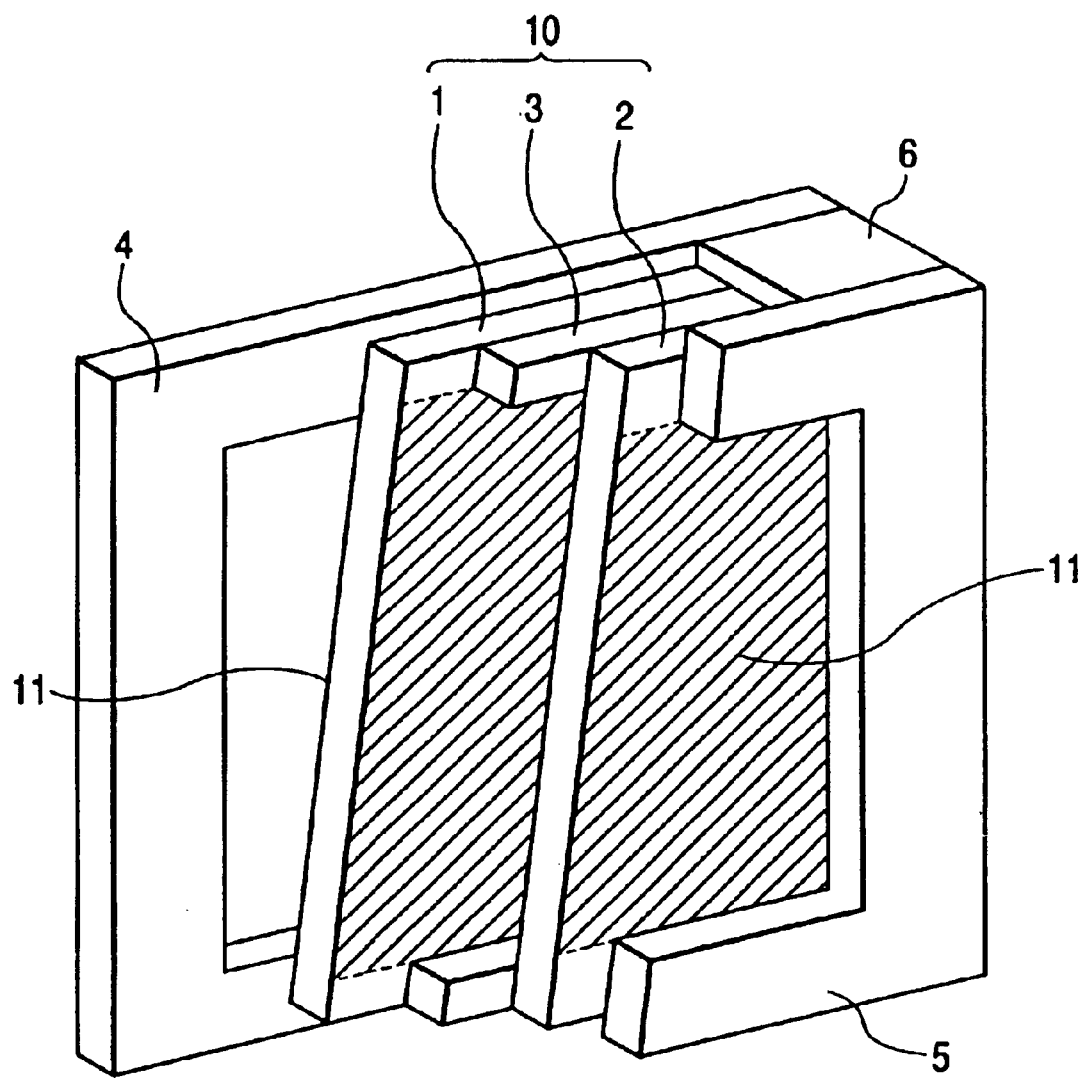
FIG. 1 is a perspective view of an image forming apparatus according to a first configuration of an embodiment of the invention.

FIG. 1 is a perspective view of an image forming apparatus according to the first configuration of an embodiment. In FIG. 1, reference numeral 2 represents a first substrate (hereinafter called a rear plate) mounted with electron emitting elements (not shown), and reference numeral 1 represents a second substrate (hereinafter called a face plate) mounted with a light emitting member (not shown) on which an image is formed upon application of an electron beam emitted from an electron emitting element. The rear plate 2 and face plate 1 are disposed facing each other and fixed on a frame 3 by baking frit glass (not shown) to thereby form an envelope (hereinafter called an image display panel) 10.

Figure 2:
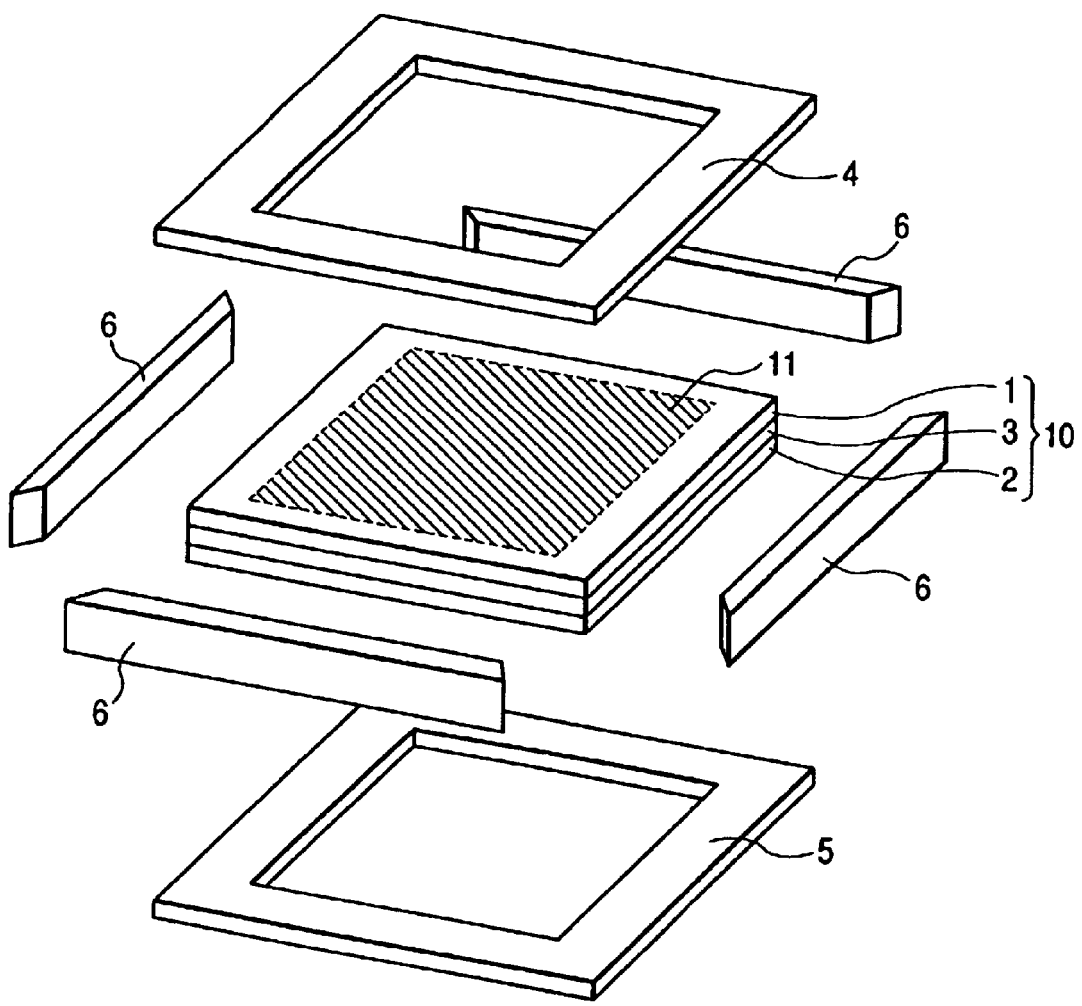
FIG. 2 is a diagram showing a disassembled state of the image forming apparatus shown in FIG. 1.

FIG. 2 is a diagram showing a disassembled state of the image forming apparatus of the first configuration. In FIG. 2, reference numeral 10 represents the image display panel. A front heat insulating member 4 and a back heat insulating member 5 are mounted on the surfaces of the image display panel on the sides of the face plate 1 and rear plate 2, respectively. Side heat insulating members 6 are mounted on the side walls of the image display panel 10. Therefore, the heat insulating members are mounted on the surfaces of the image display panel 10, excepting partial surface areas 11 on the sides of the face plate 1 and rear plate 2. These areas 11 correspond to the areas where image forming means is mounted in the envelope. In this configuration of an embodiment, the area 11 corresponds to the area where the light emitting member is disposed on the inner surface of the face plate 1, and to the area where the electron emitting elements are disposed on the inner surface of the rear plate 2. These areas 11 are hereinafter collectively called an image display area.

Figure 3:
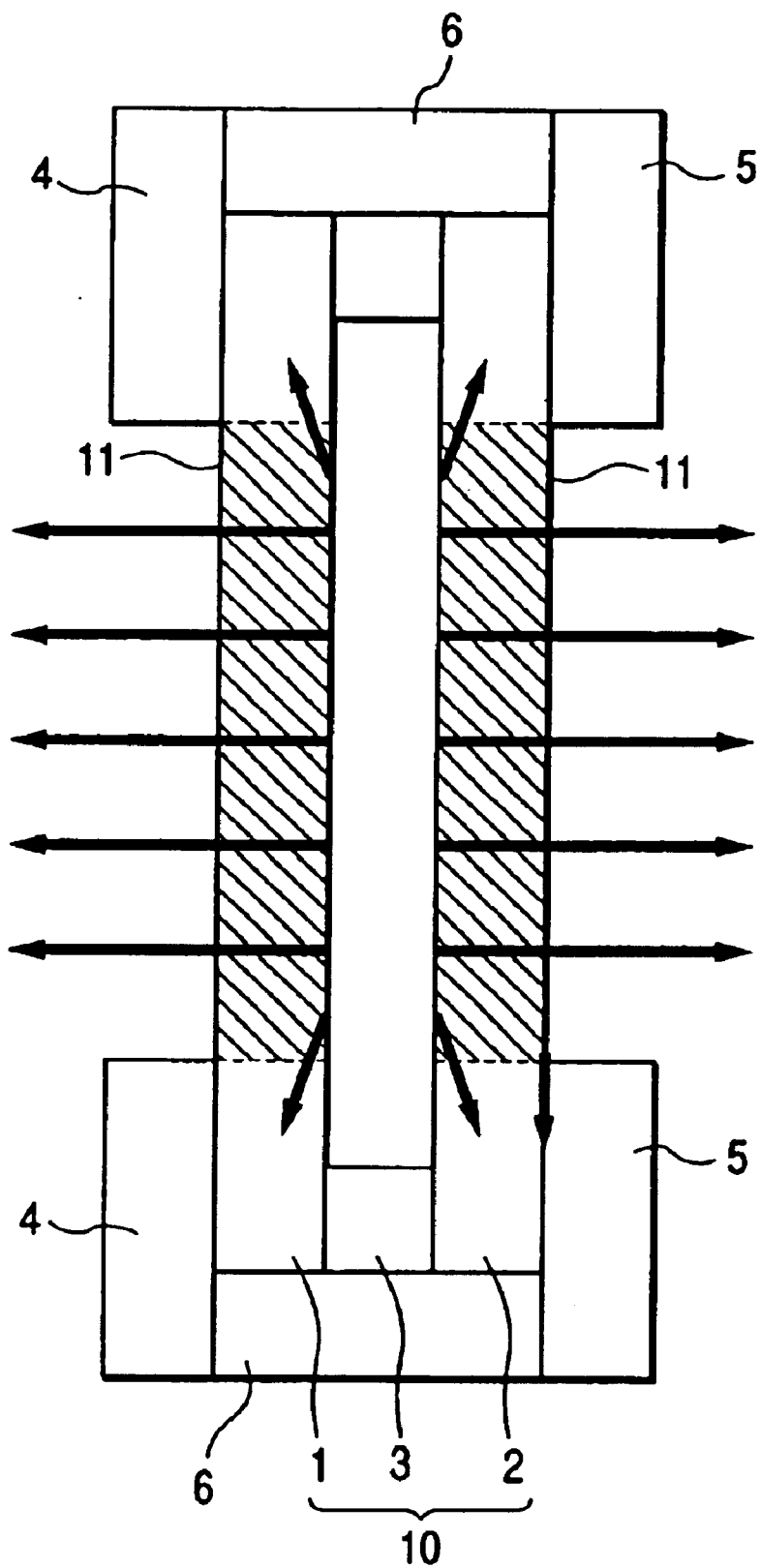
FIG. 3 is a cross sectional view illustrating the function of the image forming apparatus shown in FIG. 1.

Next, with referent to FIG. 3, the principle of the configuration will be described. In FIG. 3, arrows indicate a heat flow.

As the image display panel 10 is driven to display an image thereon by signals supplied from an external drive circuit (not shown), the image display panel generates heat. This heat is mostly generated in the image display area 11. The generated heat is dissipated from the surface of the image display panel 10. However, since the heat insulating members 4, 5 and 6 are mounted on the whole surface excepting the image display area 11 of the image display panel 10, most of the heat is dissipated from the image display area 11 on the surface of the image display panel. A portion of heat is conducted in the image display panel 10 so that the temperature of the image display panel 10 excepting the image display area 11 rises. Therefore, in a steady state, the temperature of the image display panel 10 is made uniform.

As the material of the image display panel, glass is generally used. Glass has a small thermal conductivity. A distance of a heat flow in a direction perpendicular to the surface of the image display panel 10, i.e., a thickness of each of the face plate 1 and rear plate 2, is sufficiently shorter than a half of a distance of a heat flow from the central area of the image display area 11 toward the peripheral area in a direction parallel to the surface of the image forming apparatus 10, i.e., a length of the image display panel 10 in the direction parallel to the surface thereof. Therefore, even if the heat insulating members are not mounted and heat is dissipated from the whole panel surface, most of the heat generated in the central area of the image display area 11 flows in the direction perpendicular to the surface of the image display panel 10. This means that a heat dissipation amount in the area excepting the image display area 11 hardly contributes to a heat dissipation amount in the central area of the image display area 11. Therefore, even if the surface excepting the image display area 11 is insulated from heat, the highest temperature of the image display panel 10 hardly changes.

Figure 4:
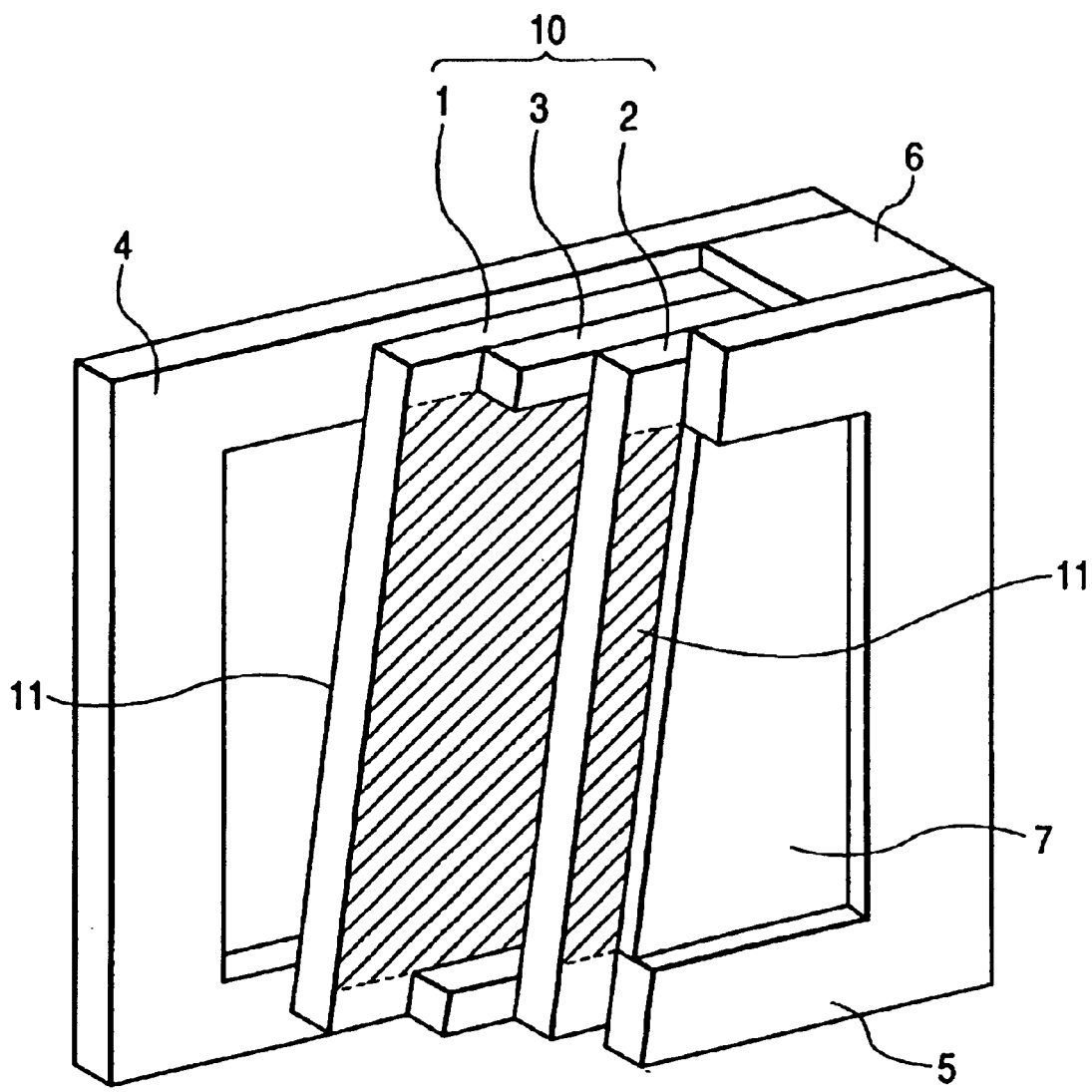
FIG. 4 is a perspective view of an image forming apparatus according to a second configuration of an embodiment of the invention.
Figure 5:
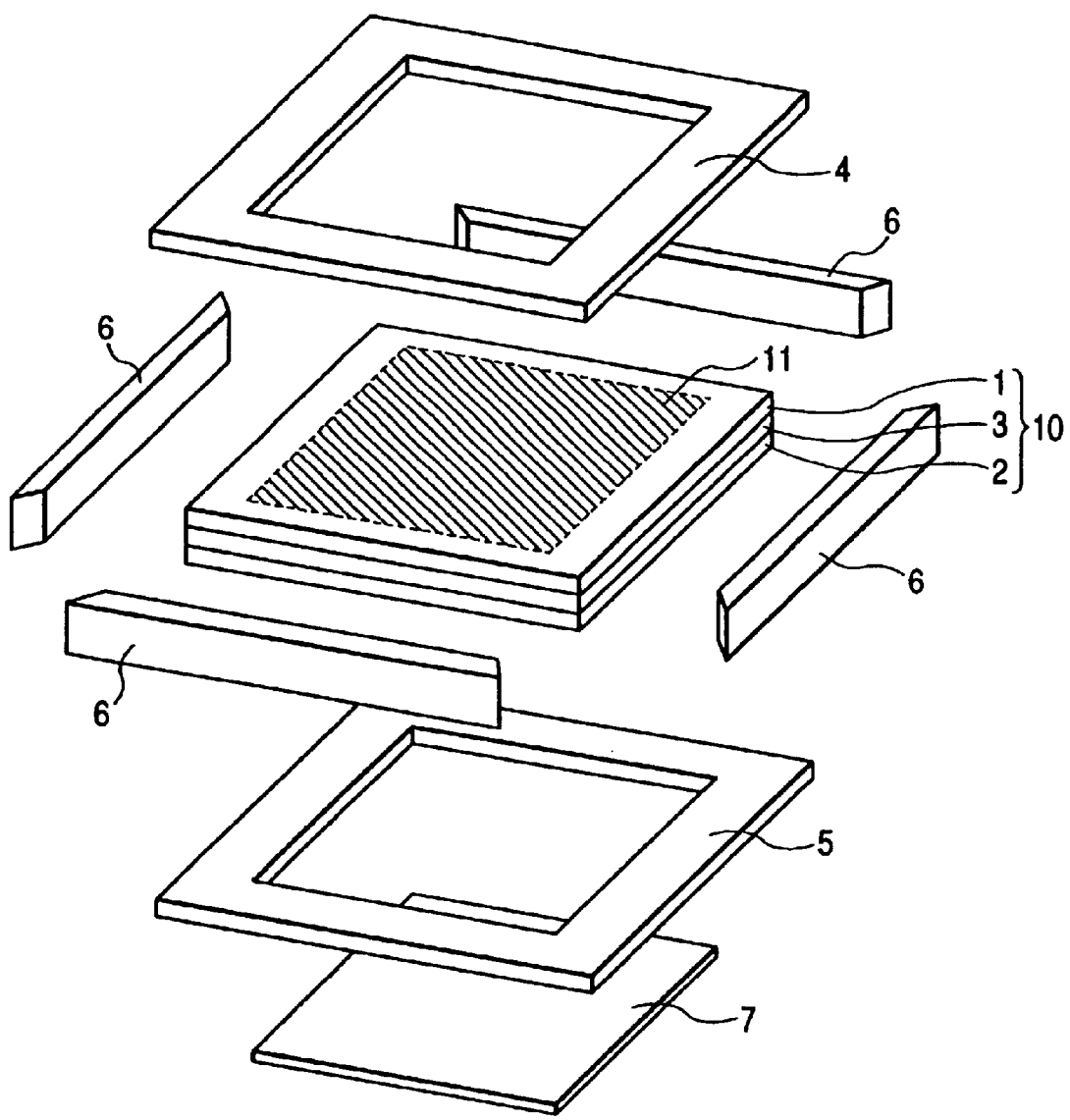
FIG. 5 is a diagram showing a disassembled state of the image forming apparatus shown in FIG. 4.
Figure 6:
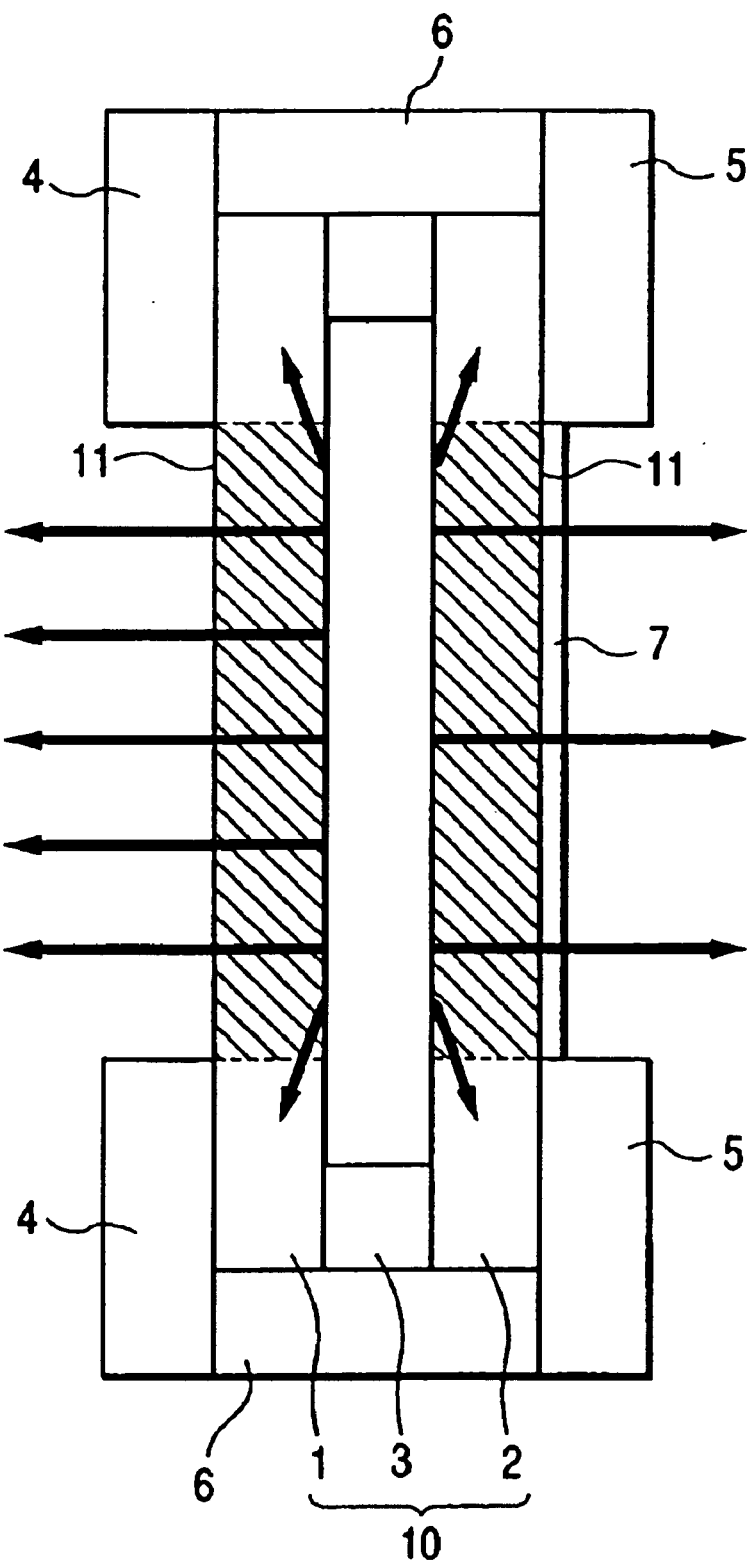
FIG. 6 is a cross sectional view illustrating the function of the image forming apparatus shown in FIG. 4.

FIGS. 4, 5 and 6 are diagrams showing an image forming apparatus of the second configuration of an embodiment. FIG. 4 is a perspective view of the image forming apparatus of the second configuration, FIG. 5 is an assembly/disassembly diagram of the apparatus, and FIG. 6 illustrates the principle of the second configuration. In FIGS. 4, 5 and 6, elements identical to those of the image forming apparatus shown in FIGS. 1 to 3 are represented by identical reference numerals.

The different point of the image forming apparatus of the second configuration from the first configuration is that a heat dissipation amount adjusting member 7 is mounted on the front surface of the rear plate 2 in area 11 where the back heat insulating member 5 is not disposed. The other structures are the same as those of the first configuration.

In the second configuration, the heat dissipation amount adjusting member 7 provides the following function in addition to the function described with reference to FIG. 3.

If there is a difference of the heat generation amount in the image display area 11, particularly between the face plate 1 and rear plate 2 of the image display panel 10, the heat dissipation amount adjusting member 7 disposed on the surface of the image display area 11 of the image display panel 10 on the side of the rear plate 2 adjusts the heat generation amount and reduces the temperature difference of the image display panel 10 between the face plate 1 side and rear plate 2 side. The heat dissipation amount adjusting member 7 functions as a heat insulating member if the heat generation amount of the face plate 1 is larger than that of the rear plate 2, and functions as a heat dissipating member in the contrary case. FIG. 6 illustrates an example where the heat generation amount of the face plate 1 is larger than that of the rear plate 2. By using heat dissipating material as the material of the heat dissipation amount adjusting member 7, the heat generation amount from the rear plate 2 side of the image display panel 10 becomes small so that the temperature on the side of the rear plate 2 of the image display panel 10 rises and the temperature difference of the image display panel 10 between the face plate 1 side and rear plate 2 side reduces.

Figure 7:
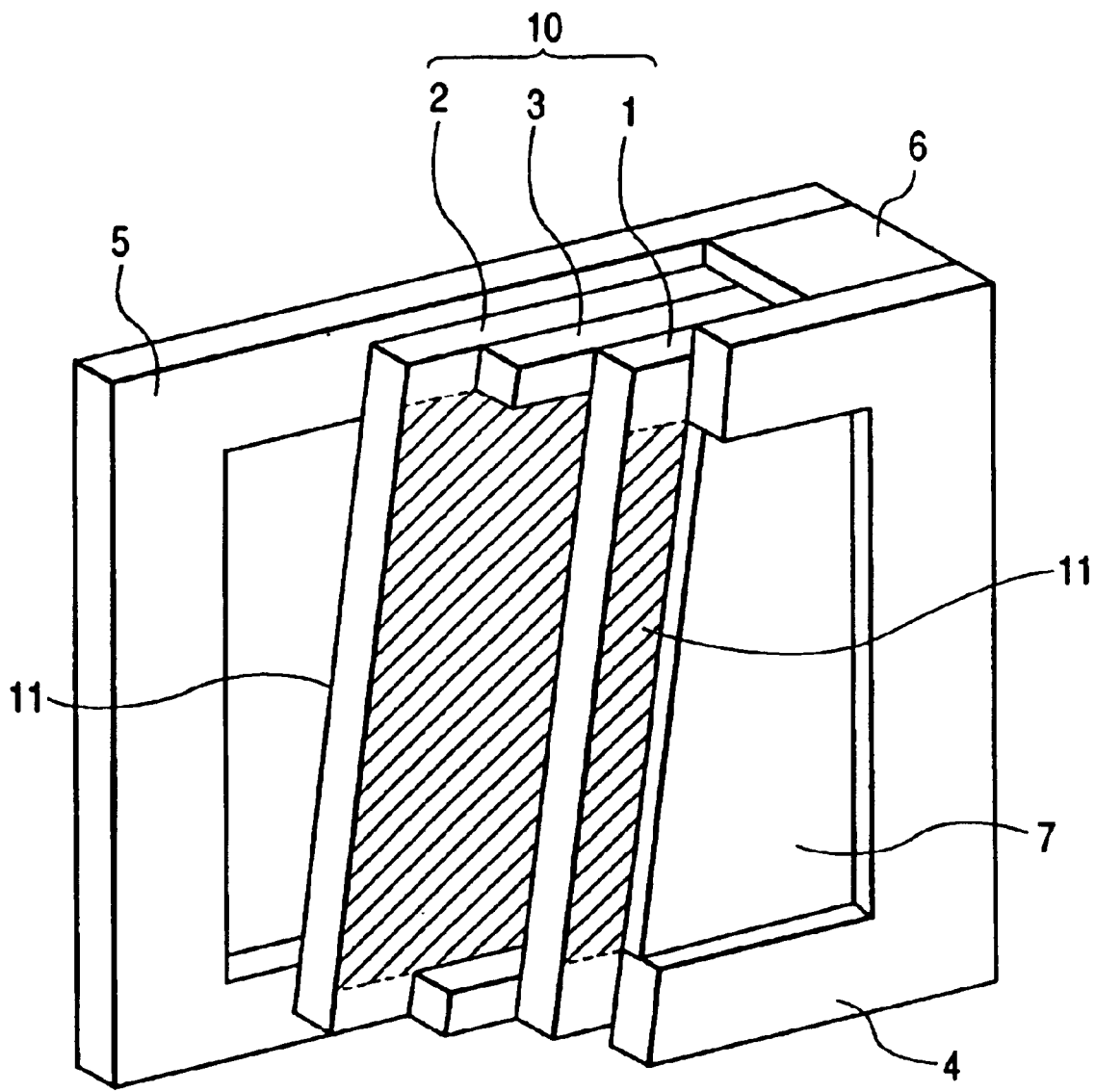
FIG. 7 is a perspective view of an image forming apparatus according to a third configuration of an embodiment of the invention.
Figure 8:
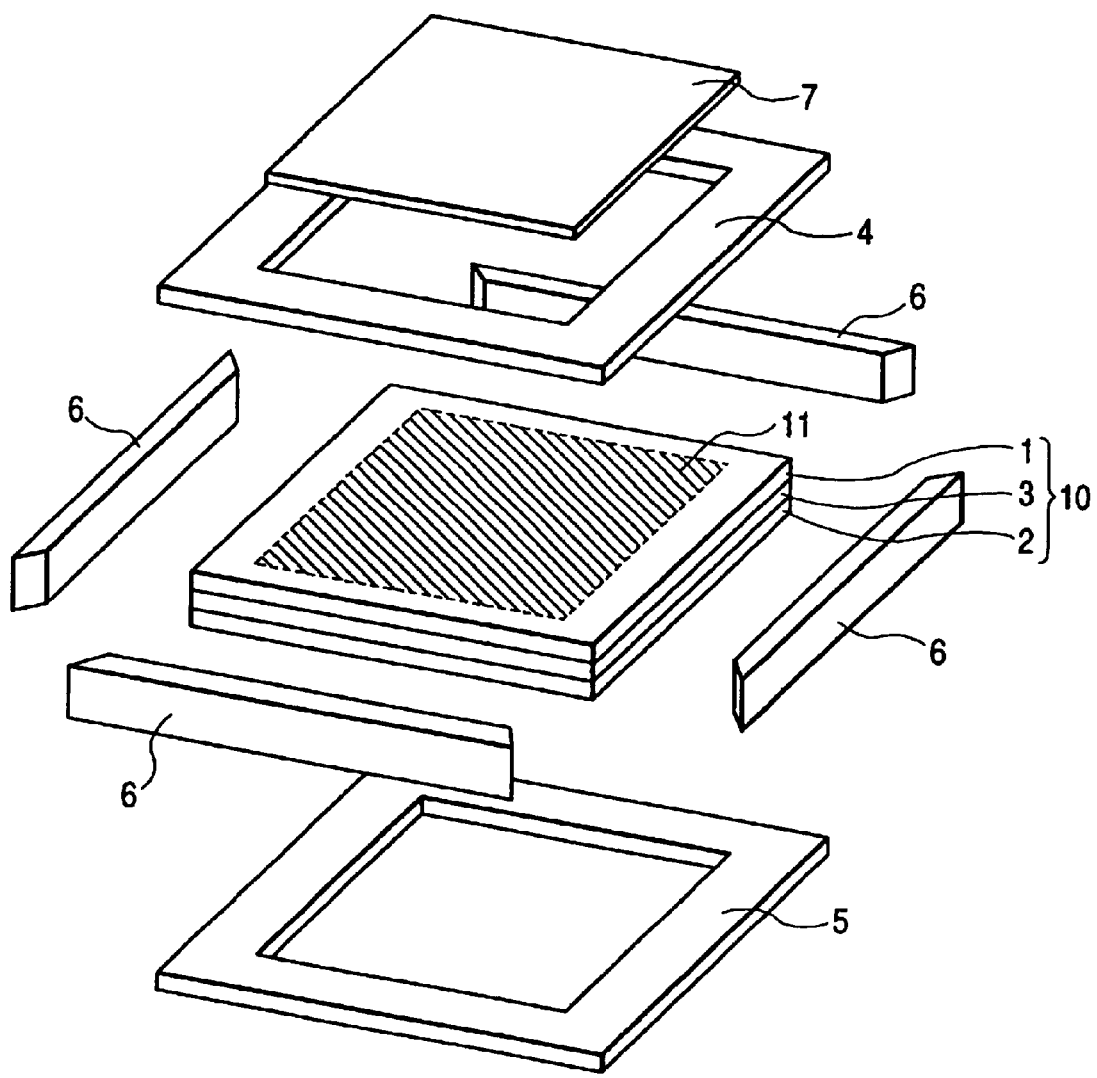
FIG. 8 is a diagram showing a disassembled state of the image forming apparatus shown in FIG. 7.
Figure 9:
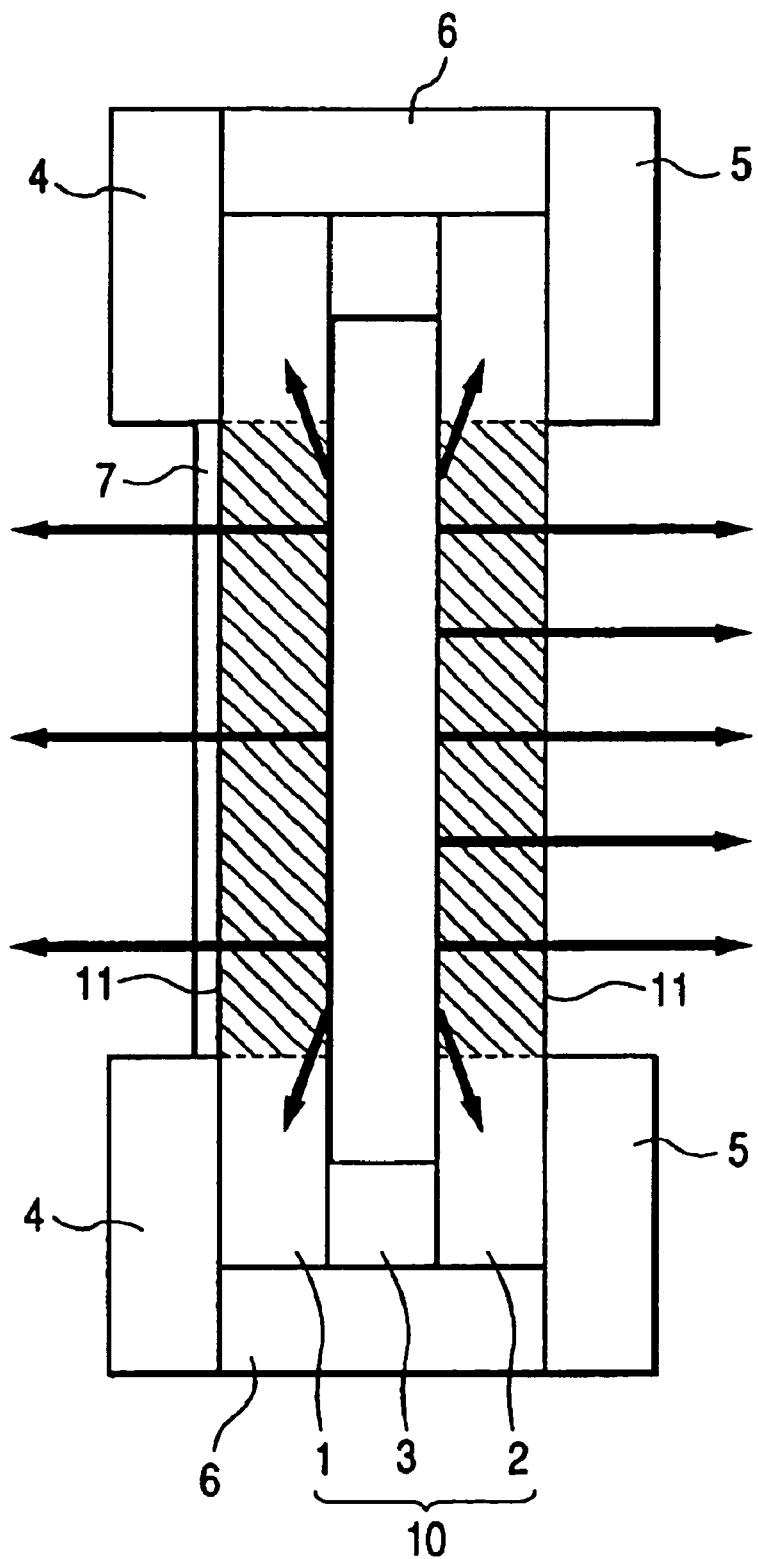
FIG. 9 is a cross sectional view illustrating the function of the image forming apparatus shown in FIG. 7.

FIGS. 7, 8 and 9 are diagrams showing an image forming apparatus of the third configuration of an embodiment. FIG.

7 is a perspective view of the image forming apparatus of the third embodiment, FIG. 8 is an assembly/disassembly diagram of the apparatus, and FIG. 9 illustrates the principle of the third configuration. In FIGS. 7, 8 and 9, elements identical to those of the image forming apparatus shown in FIGS. 1 to 3 are represented by identical reference numerals.

The different point of the image forming apparatus of the third configuration from the first configuration is that a heat dissipation amount adjusting member 7 is mounted on the front surface of the face plate 1 in area 11 where the front heat insulating member 4 is not disposed. The other structures are the same as those of the first configuration.

In the third configuration, the heat dissipation amount adjusting member 7 provides the following function in addition to the function described with reference to FIG. 3.

If there is a difference of the heat generation amount in the image display area 11, particularly between the face plate 1 side and rear plate 2 side of the image display panel 10, the heat dissipation amount adjusting member 7 disposed on the surface of the image display area 11 of the face plate 1 side of the image display panel 10 adjusts the heat generation amount and reduces the temperature difference between the face plate 1 side and rear plate 2 side of the image display panel 10. The heat dissipation amount adjusting member 7 functions as a heat dissipating member if the heat generation amount of the face plate 1 is larger than that of the rear plate 2, and functions as a heat insulating member in the contrary case. FIG. 9 illustrates an example where the heat generation amount of the rear plate 2 is larger than that of the face plate 1. By using heat dissipating material as the material of the heat dissipation amount adjusting member 7, the heat generation amount from the face plate 1 side of the image display panel 10 becomes small so that the temperature of the face plate 1 side of the image display panel 10 rises and the temperature difference between the face plate 1 side and rear plate 2 side of the image display panel 10 reduces.

In the first to third configurations of an embodiment, it is more preferable that a heat conducting member is mounted between the image display panel and the heat insulating member disposed on the surface of the image display panel.

Figure 10:
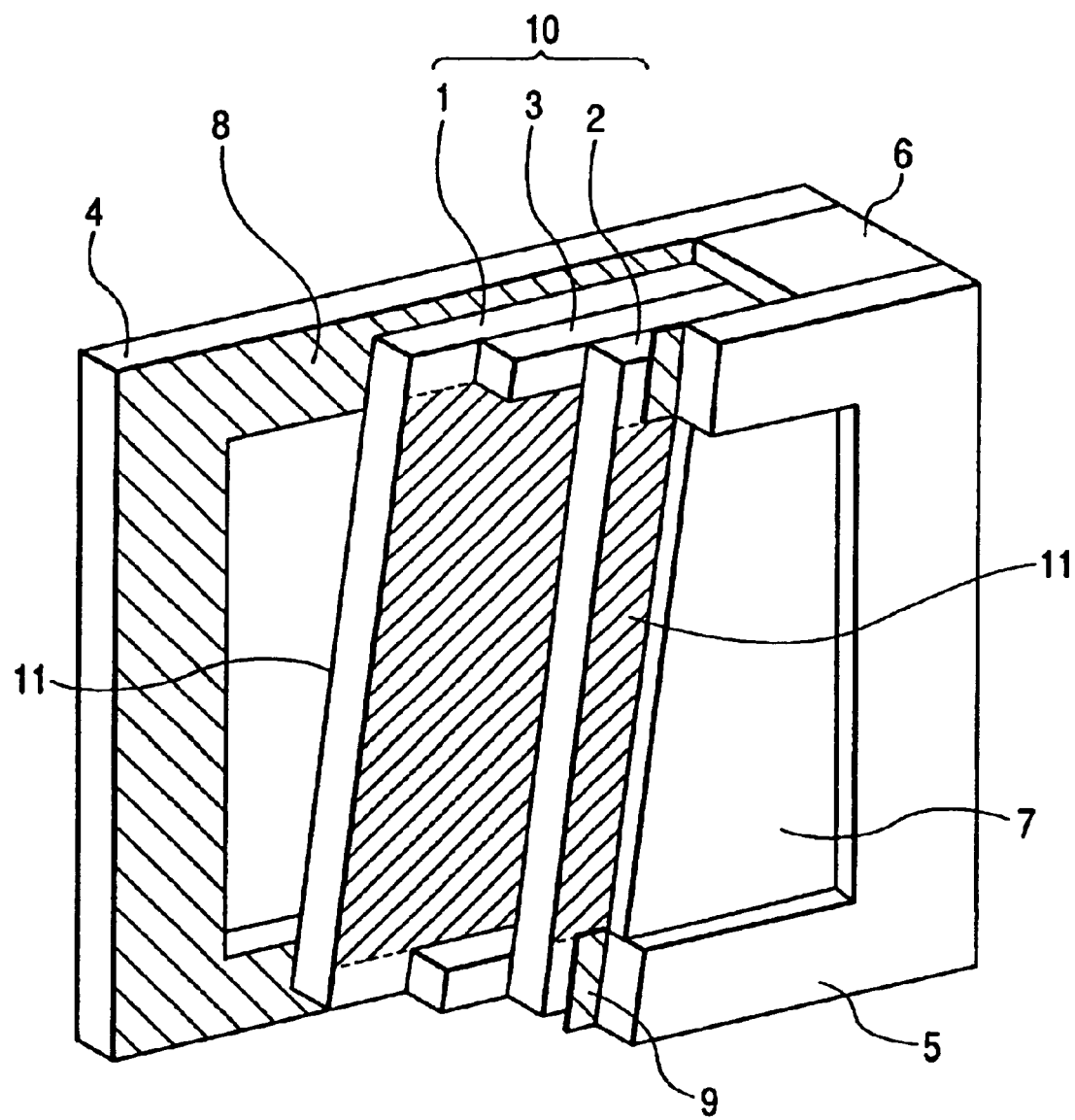
FIG. 10 is a perspective view of an image forming apparatus according to a fourth configuration of an embodiment of the invention.
Figure 11:
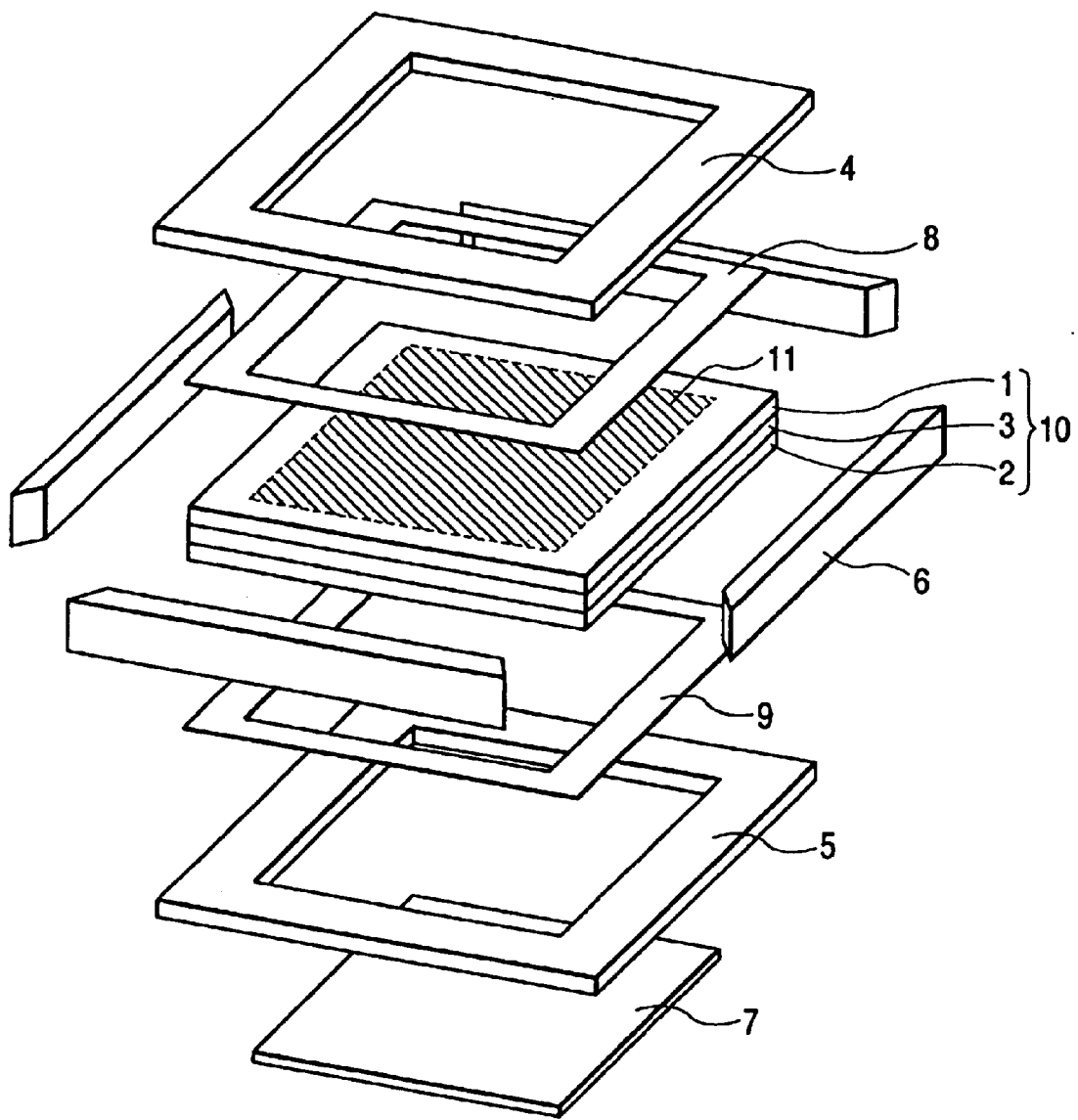
FIG. 11 is a diagram showing a disassembled state of the image forming apparatus shown in FIG. 10.
Figure 12:
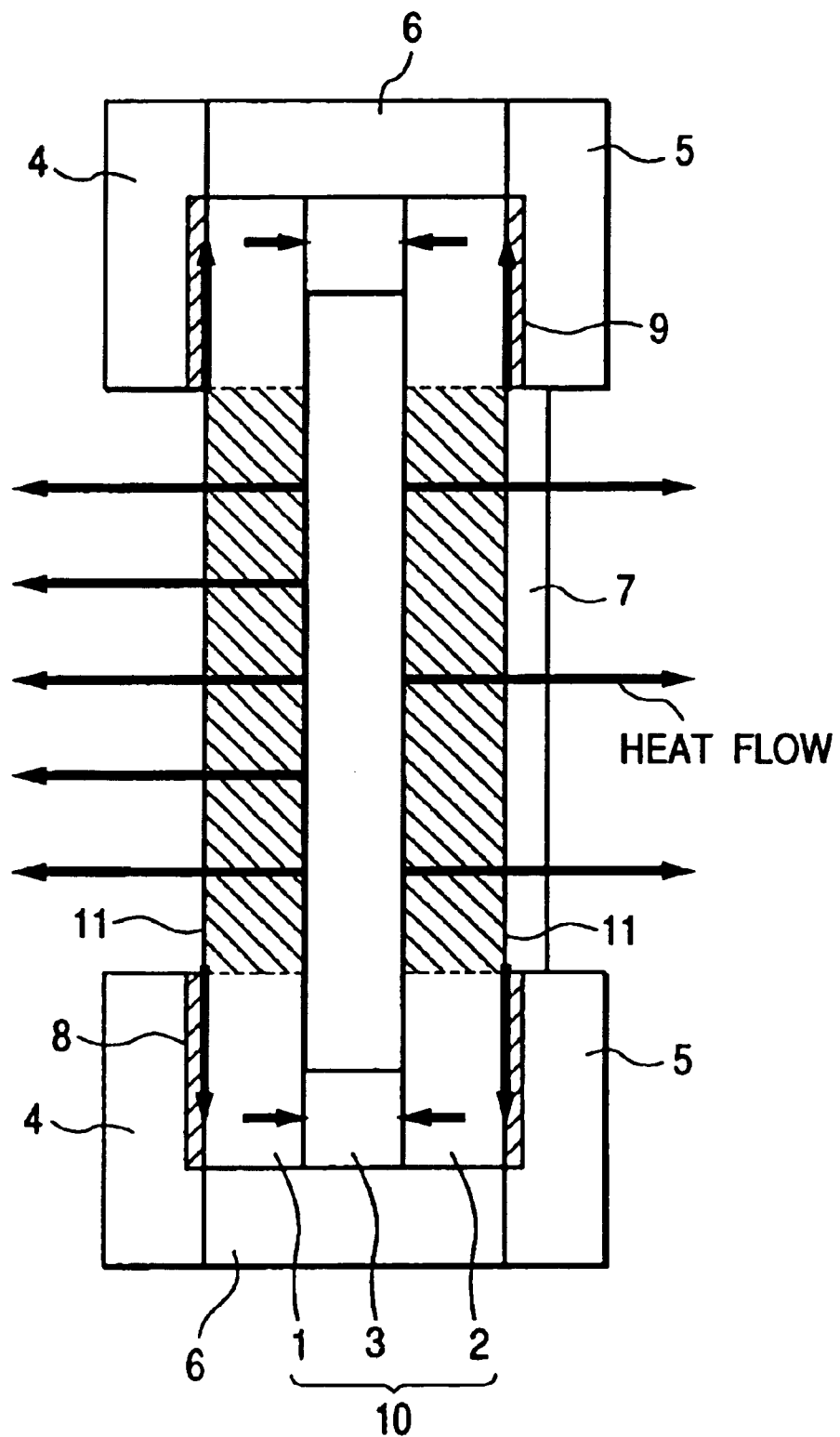
FIG. 12 is a cross sectional view illustrating the function of the image forming apparatus shown in FIG. 10.

As an example wherein the heat conducting member is mounted, an image forming apparatus of the fourth configuration of an embodiment is used as shown in FIGS. 10, 11 and 12. FIG. 10 is a perspective view of the image forming apparatus of the fourth configuration of an embodiment, FIG. 11 is an assembly/disassembly diagram of the apparatus, and FIG. 12 illustrates the principle of the fourth configuration. In FIGS. 10, 11, and 12, elements identical to those of the image forming apparatus shown in FIGS. 4 to 6 are represented by identical reference numerals.

The different points of the image forming apparatus of the fourth configuration from the second configuration are that a front heat insulating member 4 is mounted via a front heat conducting member 8 on the surface of the face plate 1 side and that a back heat insulating member 5 is mounted via a back heat conducting member 9 on the surface of the rear plate 2 side. The other structures are the same as those of the second configuration.

In the fourth configuration, the heat conducting member 8 and 9 provide the following function in addition to the function described with reference to FIGS. 3 and 6.

Since the heat insulating members 4, 5 and 6 are disposed on the whole surface excepting the image display area 11 of the image display panel 10, most of heat dissipation is from the image display area 11 of the image display panel 10. A portion of heat thermally conducts in the image display panel so that the temperature in the area other than the image display area 11 rises. In this case, as shown in FIG. 12, the thermal conduction is performed efficiently by the heat conducting members 8 and 9 so that a delay of the temperature rise in a transient state until the temperature of the image display panel enters the steady state, can be alleviated.

In the first to fourth configurations described above, it is possible to considerably suppress an uneven temperature distribution on the surface of the image display panel to be caused by heat generation in the image display area, i.e., to considerably reduce a temperature difference between the inner and outer areas of the image display area of the image display panel and a temperature difference between the face plate side and rear plate side of the image display panel to be caused by a difference between heat generation amounts. Accordingly, thermal strain of the image display panel to be caused by the temperature differences can be removed as much as possible.

In the first to fourth configurations described above, as the material of the heat insulating member, material is used which has a thermal conductivity smaller than the material of the surface layer of the image display panel. For example, for an image display panel made of glass, the material may be glass wool, ceramic fiber, urethane foam or the like.

In the above configurations, the front heat insulating member 4, back heat insulating member 5 and four side heat insulating members 6 are discrete members. However, they may be integrally formed by using urethane foam or the like, or may be a structure having small rooms partitioned so as not to allow natural convection, or a vacuum envelope. A thickness of the heat insulating member is suitably designed, desirably 1 to 30 mm.

Also in the above configurations, as the material of the heat conducting member, material is used which has a thermal conductivity larger than that of the surface layer of the material of the image display panel. For example, for an image display panel made of glass, the material may be metal such as aluminum, silver, copper and platinum, or alumina. The shape may be a sheet shape, or the heat conducting member may be integrally formed with the plated member or heat insulating film on the surface of the image display panel.

Also in the above configurations, as the material of the heat dissipating member, material is used which has a thermal conductivity larger than that of the surface layer of the material of the image display panel. For example, for an image display panel made of glass, the heat dissipating member may be a metal plate having a fin structure, a metal flat plate, a fin structure made of alumina, a flat plate made of alumina, or the like. Cooling means may be provided by mounting a water cooling pipe on a heat dissipating plate and flowing liquid therein.

(First Embodiment)

An image forming apparatus was manufactured having the above-described configuration and a matrix type electron source substrate with surface conduction type electron emitting elements. This embodiment will be described by referring again to FIGS. 10 and 11.

Reference numeral 10 represents an image display panel which is constituted of a face plate 1 provided with fluorescent body, a rear plate 2 provided with the plural electron emitting elements, a frame 3 all made of soda-lime glass. The thicknesses of the face plate 1 and rear plate 2 were both 2.8 mm and a thickness of the frame 3 was 3 mm. The thermal conductivities of the face plate 1, rear plate 2 and frame 3 were all about 0.7 W/mK. A front heat conducting member 8 and a back heat conducting member 9 made of an aluminum sheet of 200 μm in thickness were mounted as a heat conducting means on the face plate 1 and rear plate 2 in an area excepting the image display area 11 of the image display panel 10. Thereafter, a front heat insulating member 4 and a back heat insulating member 5 of glass wool were mounted as a heat insulating means. Four side heat insulating members 6 of glass wool were mounted as a heat insulating means on the side walls of the image display panel 10 as shown in FIG. 11. Although it is more preferable that each heat insulating member is thicker, the thickness is determined in accordance with a space in the envelope. In this embodiment, a thickness of 10 to 30 mm was set. As a means for adjusting a difference of the heat generation amount between the face plate 1 and rear plate 2, a heat dissipation amount adjusting member 7 of glass wool was mounted on the back surface of the rear plate 2 side in the image display area 11. A thickness of the heat dissipation amount adjusting member 7 is set properly in accordance with an output power when an image is displayed. The thermal conductivities of the front heat insulating member 4, back heat insulating member 5 and heat dissipation amount adjusting member 7 were 0.05 W/mK.

An image was displayed on the image forming apparatus by supplying a drive signal from an external drive circuit. In the image display panel, the crack which would cause slow leak to shorten the element life was not formed, even the image was displayed for a long time, and a color shift was not observed in the image.

Thermal strain to be generated in the image display panel was simulated with a computer. The thermal strain was reduced by 31% if the thickness of the heat insulating member was 10 mm, and by 48% if it was 30 mm.

A maximum temperature rise in the image display panel occurred in the central area of the image display area. This occurred in the central area both for the thicknesses of 10 mm and 30 mm of the heat insulating member when an image was displayed on each image display panel.

(Second Embodiment)

An image forming apparatus was manufactured having the above-described configuration and a matrix type electron source substrate with surface conduction type electron emitting elements.

FIG. 4 is a perspective view showing the structure of the image forming apparatus of this embodiment, and FIG. 5 is an assembly/disassembly diagram of the image forming apparatus. With reference to FIGS. 4 and 5, this structure of this embodiment will be described.

Reference numeral 10 represents an image display panel which is constituted of a face plate 1 provided with fluorescent body, a rear plate 2 provided with the plural electron emitting elements, a frame 3 all made of soda-lime glass similar to the first embodiment. The thicknesses of the face plate 1 and rear plate 2 were both 2.8 mm and a thickness of the frame 3 was 3 mm. A front heat insulating member 4 and a back heat insulating member 5 made of glass wool similar to the first embodiment were mounted as a heat insulating means on the surfaces of the face plate 1 side and rear plate 2 side of the image display panel 10 in the area other than the image display area 11. Four side heat insulating members 6 of glass wool similar to the first embodiment were mounted as a heat insulating means on the side walls of the image display panel 10 as shown in FIG. 5. Although it is more preferable that each heat insulating member is thicker, the thickness is determined in accordance with a space in the envelope. In this embodiment, a thickness of 10 to 30 mm was set. As a means for adjusting a difference of the heat generation amount between the face plate 1 and rear plate 2, a heat dissipation amount adjusting member 7 of glass wall similar to the first embodiment was mounted on the back surface side of the rear plate 2 in the image display area 11. A thickness of the heat dissipation amount adjusting member 7 is set properly in accordance with an output power when an image is displayed.

An image was displayed on the image forming apparatus by supplying a drive signal from an external drive circuit. In the image display panel, any undesirable crack was not formed, even the image was displayed for a long time, and a color shift was not observed in the image.

Thermal strain to be generated in the image display panel was simulated with a computer. The thermal strain was reduced by 11% if the thickness of the heat insulating member was 10 mm, and by 23% if it was 30 mm.

A maximum temperature rise in the image display panel occurred in the central area of the image display area. This occurred in the central area both for the thicknesses of 10 mm and 30 mm of the heat insulating member when an image was displayed on each image display panel.

(Third Embodiment)

In this embodiment, the invention is applied to an image forming apparatus in which an amount of heat generation from the side of the rear plate formed with electron emitting elements is larger than an amount of heat generation from the side of the face plate mounted with a light emitting member and a temperature on the rear plate side is higher than a temperature on the face plate side.

Figure 13:
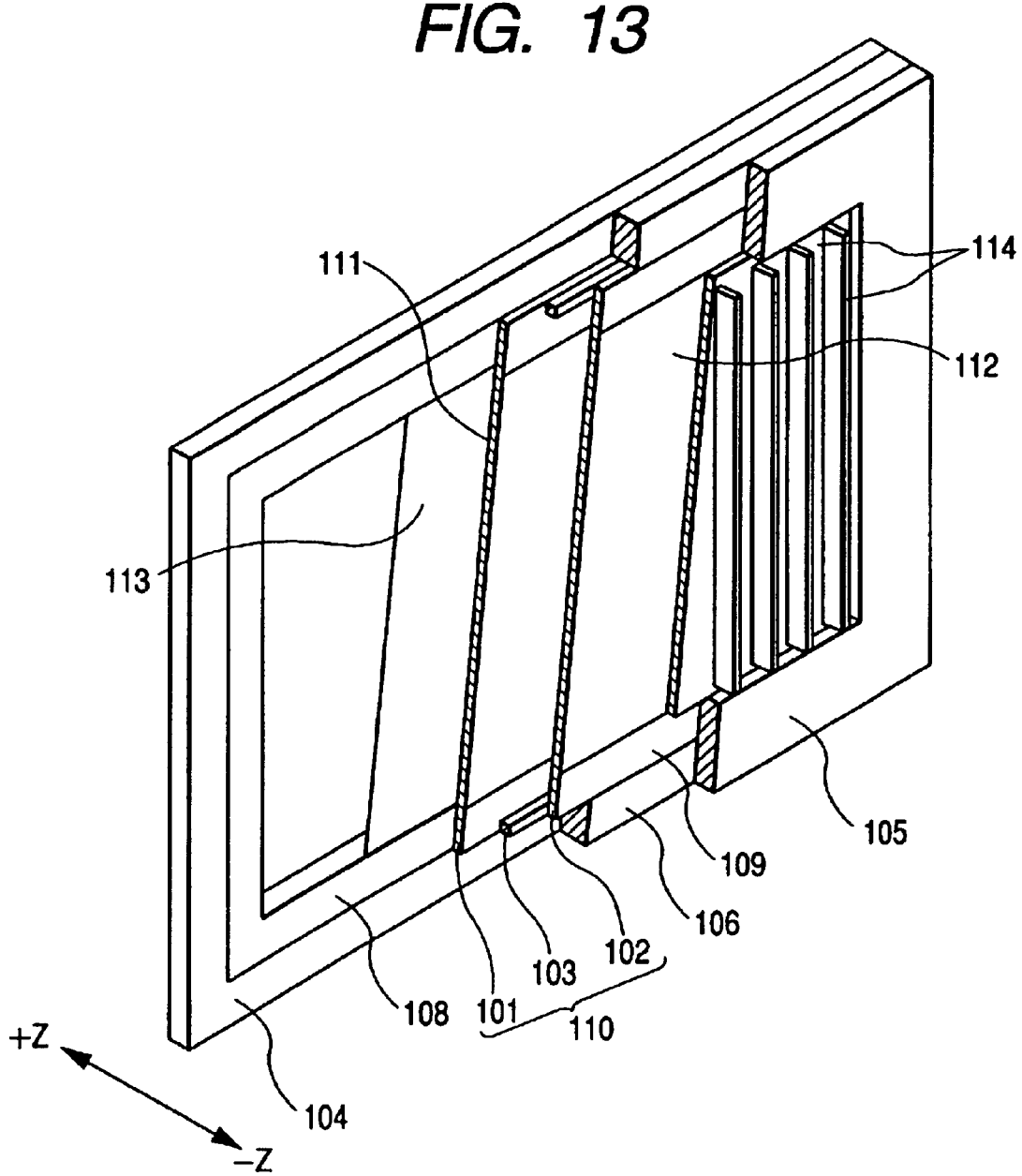
FIG. 13 is a perspective view of an image forming apparatus according to a third embodiment of the invention.
Figure 14:
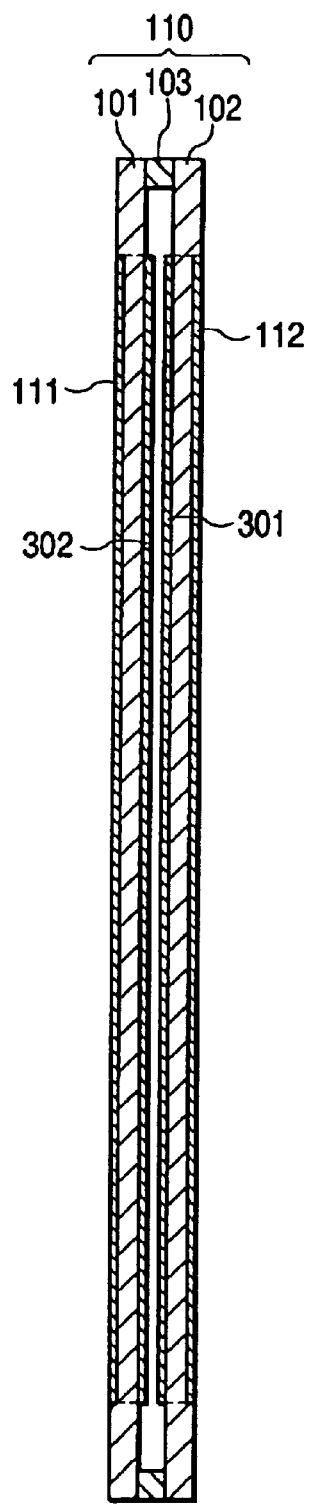
FIG. 14 is a cross sectional view showing an image display panel of the image forming apparatus shown in FIG. 13.
Figure 15:
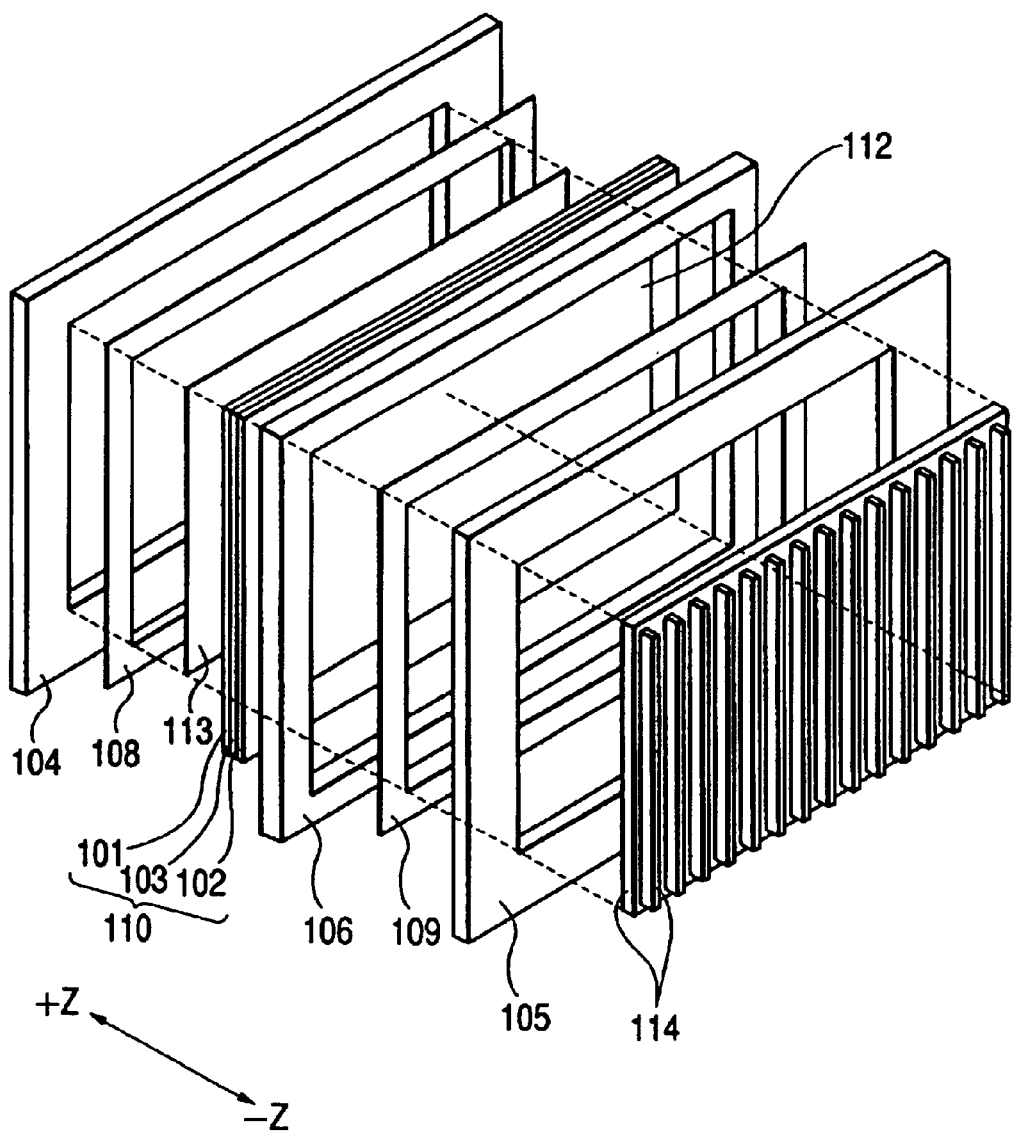
FIG. 15 is a diagram showing a disassembled state of the image forming apparatus shown in FIG. 13.

FIGS. 13, 14 and 15 are diagrams illustrating this embodiment. FIG. 13 is a perspective view partially broken of the image forming apparatus, FIG. 14 is a cross sectional view of an image display panel, and FIG. 15 is an assembly/disassembly view of the image forming apparatus.

First, the image display panel will be described with reference to FIG. 14. Reference numeral 102 represents a rear plate on which a plurality of electron emitting elements 301 are mounted. Reference numeral 101 represents a face plate on which a light emitting member 302 is mounted for radiating light and forming an image when an electron beam emitted from the electron emitting element and accelerated is applied. Reference numeral 103 represents a frame, and reference numeral 110 represents an image display panel which is formed by mounting the face plate 101 and rear plate 102 on the frame 103 and fixing them by baking frit glass (not shown). In this embodiment, the electron emitting element is a surface conduction type electron emitting element. The image display panel having the above-described structure can be manufactured by using techniques disclosed and detailed, for example, in JP-A-07-235255. The details thereof are omitted herein. Wiring leads and atmospheric resistant support members are omitted and not shown.

The face plate 101, rear plate 102 and frame 103 are made of soda-lime glass (3 mm in thickness) having a thermal conductivity of about 0.7 W/mK.

Reference numeral 111 represents an image display area on the side of the face plate 101 which area on the face plate faces the light emitting member 302. In the image display area 111, a heat flow caused by an electron beam application to the light emitting member 302 is directed in the image display area 111 in the +Z direction.

Reference numeral 112 represents an image display area on the side of the rear plate 102 which area on the rear plate faces the electron emitting elements 301. In the image display area 112, a heat flow from the electron emitting elements 301 is directed in the −Z direction.

The image display areas 111 and 112 have approximately the same size.

Next, with reference to FIG. 13, the structure of the image forming apparatus will be described. Reference numeral 110 represents the image display panel which is constituted of the face plate 101, rear plate 102 and frame 103 as described with reference to FIG. 14. Reference numeral 104 represents a front heat isolating member made of a heat insulating board having a thickness of 20 mm, with an area corresponding to the image display area 111 being punched out. The heat insulating member 104 is made of the material whose main components are fibers of silica-alumina raw material, and has a thermal conductivity of about 0.07 W/mK. Reference numeral 108 represents a front thermal conducting member disposed between the face plate 101 and front heat insulating member 104 in an outer area relative to the image display area 111 on the side of the face plate 101, and made of a graphite sheet having a thickness of 0.05 mm. The thermal conductivity of the graphite sheet is about 200 W/mK.

Reference numeral 105 represents a back heat insulating member made of the same heat insulating board as the front heat insulating member 104, with an area corresponding to the image display area 112 being punched out. Reference numeral 109 represents a back heat conducting member disposed between the rear plate 102 and back heat insulating member 105 in an outer area relative to the image display area 112 on the side of the rear plate 102. The thermal conductivity of the aluminum alloy sheet is about 120 W/mK.

Reference numeral 106 represents a side heat insulating member made of a heat insulating board (same material as the heat insulating boards 104 and 105) having an outer size larger than that of the image display panel 110 by 40 mm and a thickness of 5 mm, with an area corresponding to the image display panel 110 being punched out to form a frame having a width of 20 mm.

Reference numeral 113 represents a transparent heat insulating film disposed in an outer area (in the +Z direction) relative to the image display area on the side of the face plate 101. The heat insulating film 113 is made of a polyethylene terephthalate (PET) film having a thickness of 0.2 mm, a thermal conductivity of about 0.3 W/mK and a visible light transmittance of about 98%. The heat insulating film 113 functions as a heat dissipation amount adjusting member. Although the thickness of this film 113 is thin as different from the other heat insulating members, the thickness corresponds to about 0.5 mm as converted into a thermal thickness of soda-lime glass, and provides a sufficient heat insulating effect.

Reference numeral 114 represents a heatsink plate having a fin for enhancing heat dissipation. The heatsink plate 114 is mounted on an outer area (−Z direction) relative to the image display area 112 on the side of the rear plate 102 by using a both-side thermal conductive tape. The heatsink plate 114 is made of magnesium alloy having a thermal conductivity of about 50 W/mK. The heatsink plate 114 with the fin was integrally manufactured by a die-cast method. The heatsink plate 114 with the fin functions as a heat dissipation adjusting member. Heat dissipation was conducted through natural convection.

If the heatsink plate 114 with the fin becomes in contact with the back heat conducting member 109, the temperature of the back heat conducting member 109 lowers. It is therefore preferable to provide a space of about 1 mm to 30 mm between the heatsink plate 114 with the fin and the back heat conducting member.

Next, an assembly method for the image forming apparatus will be described with reference to FIG. 15. First, the heat insulating film 113 is adhered to the image display area 111 of the outer face of the face plate 101 by using achromatic and transparent acrylic adhesive (about 25 μm thick). Next, on the front heat insulating member 104, the front heat conducting member 108 and side heat insulating member 106 are sequentially mounted, and the image display panel 110 is fitted into an opening of the side heat insulating member 106. Then, the back heat conducting member 109 is mounted in an outer area relative to the image display area 112 on the outer side of the rear plate 102, and the back heat insulating member 105 is mounted. Next, the heatsink plate 114 with the fin is adhered to the image display area 112 on the side of the rear plate 102 by using a both-side thermal conductive tape (not shown) to complete the assembly.

The heat insulating members are fixed together by adhesive (not shown). Since the adhesive between the heat insulating members provides a heat insulating effect, the adhesive is selected by taking preference of a fixing strength. The thermal conductivity of the acrylic adhesive is 0.1 to 0.5 W/mK and the thickness thereof is 25 μm, so that this acrylic adhesive plays a partial roll of the heat insulating effect of the heat insulating film 113.

An image was displayed on the image forming apparatus assembled in the above manner by supplying image signals from an external drive circuit. A temperature of the apparatus was measured with a thermoviewer (infrared thermometer) and a thermocouple, a thermal strain was measured with a strain gage, and a pixel color shift was observed with a magnifying lens. A temperature difference of the outer surface of the image display panel was 3° C. or smaller, and the thermal strain was 1 MPa which was in a measurement error range. A color shift of an image to be caused by a thermal expansion difference between the face plate 101 and rear plate 102 was not observed.

In this embodiment, with respect to the +Z direction of the image display panel, the temperature of the image display area 111 in an outer area (+Z direction) relative to the face plate 101 rose because of the heat insulating film 113, whereas the temperature of the image display area 112 in an outer area (−Z direction) relative to the rear plate 102 lowered because of the heatsink plate 114. The temperatures of the face plate 101 and rear plate 102 were therefore able to be made generally equal and there was no temperature difference between the front and back of the image display panel. As a result, a color shift of an image to be caused by a warp of the image display panel resulting from thermal expansion was not observed.

Also in this embodiment, with respect to the in-plane direction (plane perpendicular to the Z-axis) of the image display panel, a temperature difference in the in-plane was reduced because of front, back and side heat insulating members. The thermal strain (stress) at an area (low temperature area) where thermal strain was generated conventionally was in a measurement error range and sufficiently reduced. As a result, vacuum slow leak from cracks to be caused by thermal strain was not observed, and the image forming apparatus was able to be driven stably for a long time.

In this embodiment, silica-alumina material is used as the material of the heat insulating board. A heat insulating board made of glass wool, rock wool or the like was used and same advantages as above were obtained.

Cooling by the heatsink plate with the fin is conducted by natural convection. Instead, the fin may not be used if the heat generation amount of the rear plate 102 is slightly larger than that of the face plate 101, whereas if the heat generation amount of the rear plate 102 is much larger than that of the face plate 101, it is preferable to cool the heatsink 114 with the fin through forced air cooling.

Although magnesium alloy is used as the material of the heatsink plate 114 with the fin, metal or metal alloy may also be used. Non-metallic material such as alumina having a higher thermal conductivity than glass may be used or the fin may be formed through a cutting work, with similar advantages described above.

In this embodiment, although the heatsink 114 with the fin is manufactured by a die-cast method, it may be formed by a thixo-mold method.

(Fourth Embodiment)

In this embodiment, the invention is applied to an image forming apparatus in which an amount of heat generation from the side of the rear plate formed with electron emitting elements is smaller than an amount of heat generation from the side of the face plate mounted with a light emitting member and a temperature on the face plate side is higher than a temperature on the rear plate side.

Figure 16:
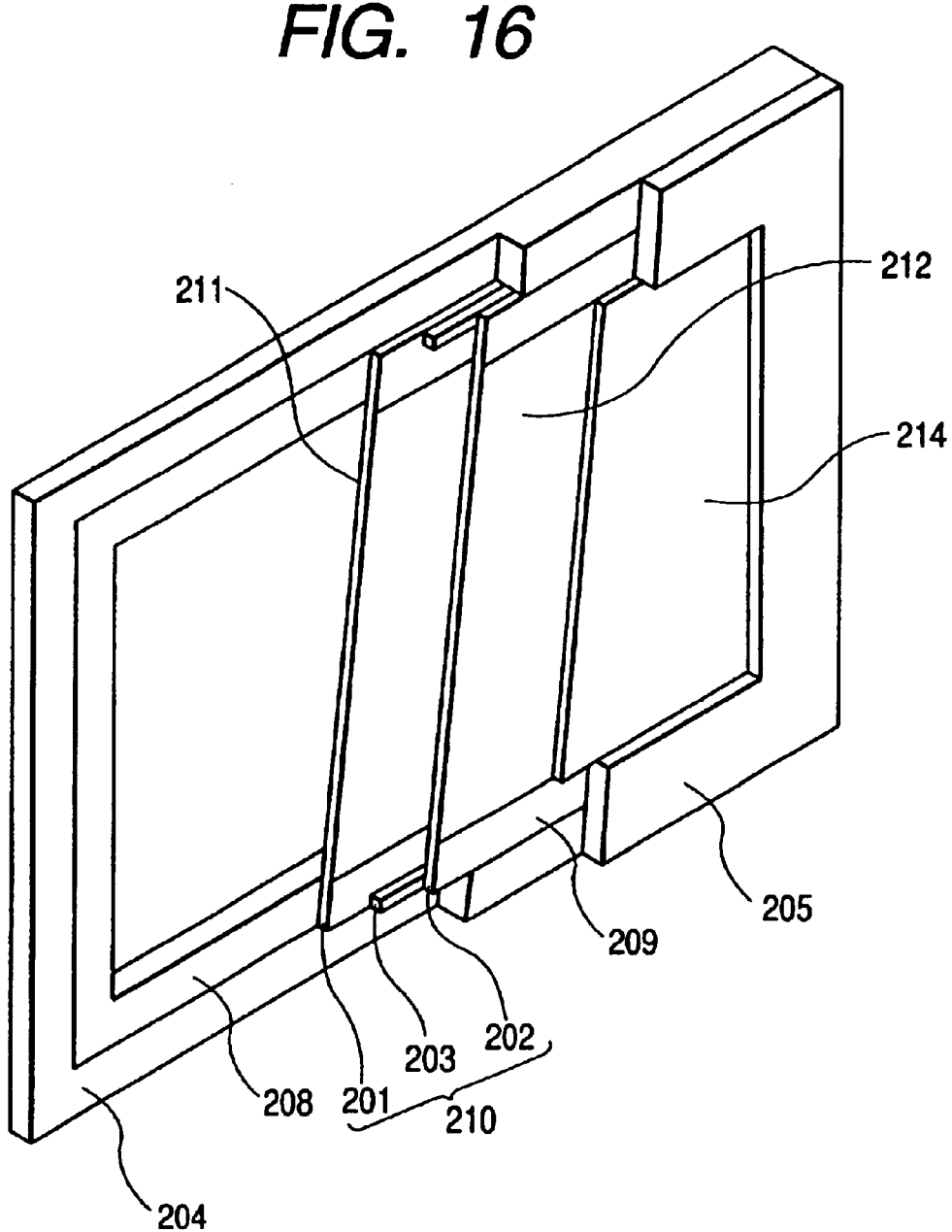
FIG. 16 is a perspective view of an image forming apparatus according of a fourth embodiment of the invention.
Figure 17:
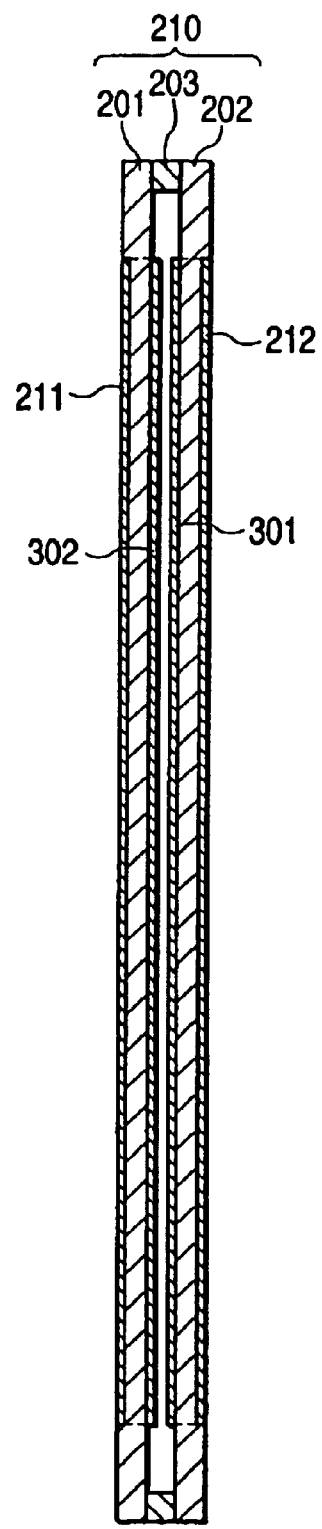
FIG. 17 is a cross sectional view showing an image display panel of the image forming apparatus shown in FIG. 16.
Figure 18:
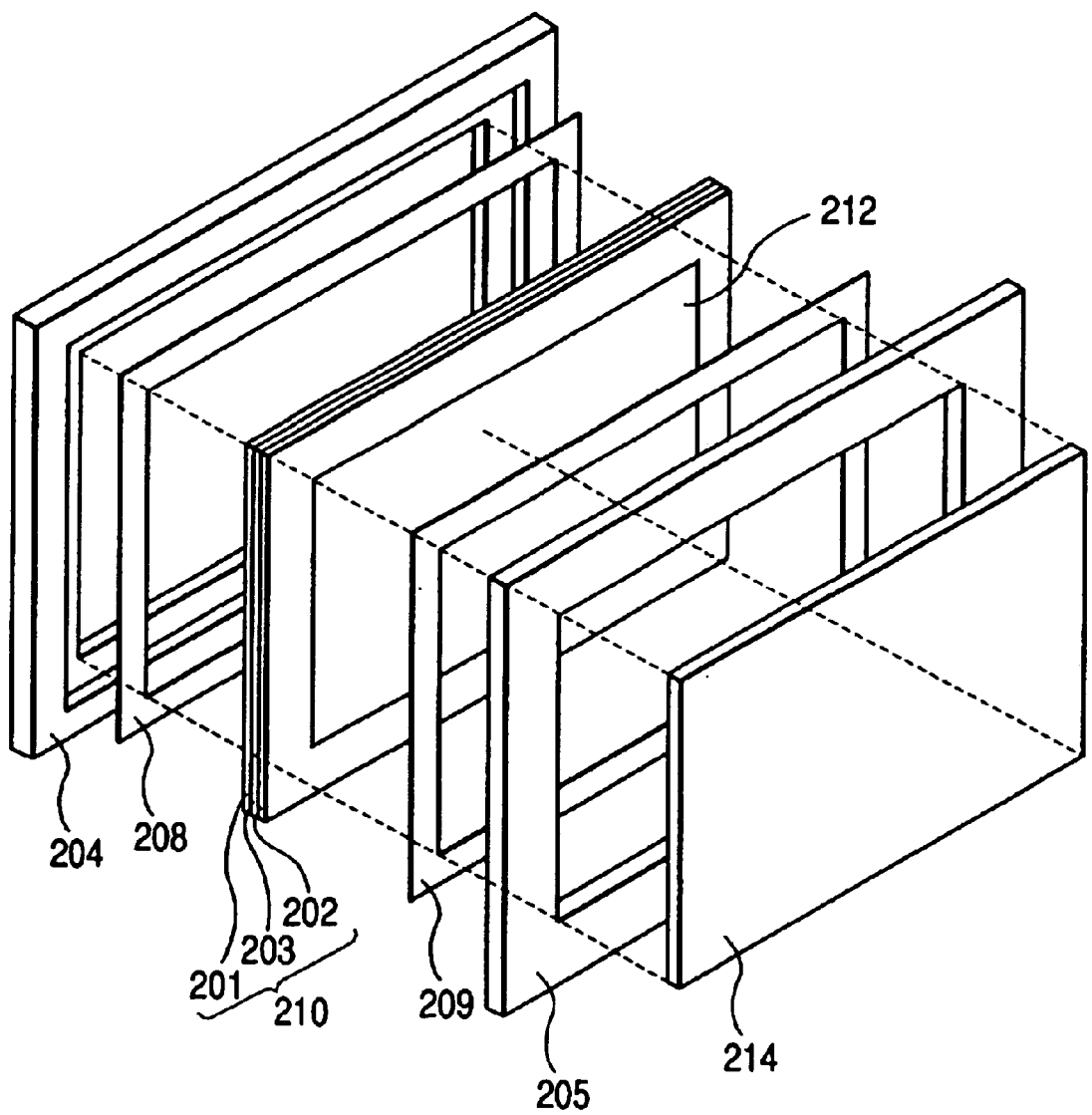
FIG. 18 is a diagram showing a disassembled state of the image forming apparatus shown in FIG. 16.

FIGS. 16, 17 and 18 are diagrams illustrating this embodiment. FIG. 16 is a perspective view partially broken of the image forming apparatus, FIG. 17 is a cross sectional view of an image display panel, and FIG. 18 is an assembly/disassembly view of the image forming apparatus.

First, the image display panel will be described with reference to FIG. 17. Reference numeral 202 represents a rear plate on which a plurality of electron emitting elements 301 are mounted. Reference numeral 201 represents a face plate on which a light emitting member 302 is mounted for radiating light and forming an image when an electron beam emitted from the electron emitting element and accelerated is applied. Reference numeral 203 represents a frame, and reference numeral 210 represents an image display panel which is formed by mounting the face plate 201 and rear plate 202 on the frame 203 and fixing them by baking frit glass (not shown). In this embodiment, the electron emitting element is a surface conduction type electron emitting element. The image display panel having the above-described structure can be manufactured by using techniques disclosed and detailed, for example, in JP-A-07-235255. The details thereof are omitted herein. Wiring leads and atmospheric resistant support members are omitted and not shown.

The face plate 201, rear plate 202 and frame 203 are made of soda-lime glass (3 mm in thickness) having a thermal conductivity of about 0.7 W/mK.

Reference numeral 211 represents an image display area on the side of the face plate 201 which area on the face plate faces the light emitting member 302. In the image display area 211, a heat flow caused by an electron beam application to the light emitting member 302 is directed in the image display area 211 in the +Z direction.

Reference numeral 212 represents an image display area on the side of the rear plate 202 which area on the rear plate faces the electron emitting elements 301. In the image display area 212, a heat flow from the electron emitting elements 301 is directed in the -Z direction.

The image display areas 211 and 212 have approximately the same size.

Next, with reference to FIG. 16, the structure of the image forming apparatus will be described. Reference numeral 210 represents the image display panel which is constituted of the face plate 201, rear plate 202 and frame 203 as described with reference to FIG. 17. Reference numeral 204 represents a front/side heat insulating member made of urethane foam material which is formed by integrally molding a front heat insulating member and a side heat insulating member. The thickness is 3 mm. The heat insulating member 204 has an opening in an area corresponding to the image display area 211. The thermal conductivity of the urethane foam material is about 0.04 W/mK. Reference numeral 208 represents an aluminum sheet having a thickness of 50 $\mu$m adhered and fixed to the surface of the heat insulating member 204 on the side of the face plate 201 by using adhesive. Since the adhesive between the heat insulating members provides a heat insulating effect, the adhesive is selected in view of preference of a fixing strength.

Reference numeral 205 represents a back heat insulating member made of the same heat insulating board as the heat insulating member 204, with an area corresponding to the image display area 212 being punched out. Reference numeral 209 represents a back heat conducting member disposed between the rear plate 202 and back heat insulating member 205, and adhered and fixed to the surface of the back heat insulating member 20 on the side of the rear plate 202, the back heat conducting member 209 being made of an aluminum sheet having a thickness of 50 $\mu$m.

Reference numeral 214 represents a heat insulating sheet disposed in an outer area (-Z direction) relative to the image display area 212 on the side of the rear plate 202. The heat insulating sheet 214 has a thickness of 0.4 mm and is made of the material having as its main components fibers of a high alumina material. The heat insulating sheet 214 can raise the temperature of the rear plate 202.

Next, an assembly method for the image forming apparatus will be described with reference to FIG. 18. First, the image display panel 210 is fitted into the opening of the integrally formed heat insulating member 204 and front heat conducting member 208. Then, the back heat insulating member 205 with the adhered back heat conducting member 209 is mounted. Next, the heat insulating sheet 214 is adhered to the image display area 212 on the side of the rear plate 202 by using adhesive (not shown) to complete the assembly. The heat insulating members are fixed together by adhesive (not shown). It is more preferable to tightly adhere the heat insulating sheet 214 and back heat insulating member 205, because the heat insulating effect is improved.

An image was displayed on the image forming apparatus assembled in the above manner by supplying image signals from an external drive circuit. An image was not degraded by vacuum slow leak to be caused by thermal strain even if the apparatus was operated for a long time, and a color shift of an image to be caused by a thermal expansion difference between the face plate 201 and rear plate 202 was not observed.

In this embodiment, with respect to the +Z direction of the image display panel, the temperature of the image display area 212 in an outer area (-Z direction) relative to the rear plate 201 rose because of the heat insulating film 214, and the temperatures of the face plate 201 and rear plate 202 were able to be made generally equal and there was no temperature difference between the front and back of the image display panel. As a result, a color shift of an image to be caused by a warp of the image display panel resulting from thermal expansion was not observed.

Also in this embodiment, with respect to the in-plane direction (plane perpendicular to the Z-axis) of the image display panel, a temperature difference in the in-plane was reduced because of front, back and side heat insulating members. The thermal strain (stress) at an area (low temperature area) where thermal strain was generated conventionally was in a measurement error range and sufficiently reduced. As a result, vacuum slow leak from cracks to be caused by thermal strain was not observed, and the image forming apparatus was able to be driven stably for a long time.

In this embodiment, urethane foam material is used as the material of the heat insulating board. A mold of fine ceramics may be used as the heat insulating board. In this case, for example, aluminum was vapor deposited on the surface of the mold to form the front heat conductive member, with similar advantages described above.

In the first to fourth embodiments described above, the heat insulating effect can be improved by executing particularly the following process for the surface of the heat insulating member. With an improved heat insulating effect, the thickness of the heat insulating member can be made as thin as 2 to 5 mm and the image forming apparatus can be made more thinner.

This process will be described specifically by using as an example the heat insulating member 204 of the fourth embodiment.

Figure 19:
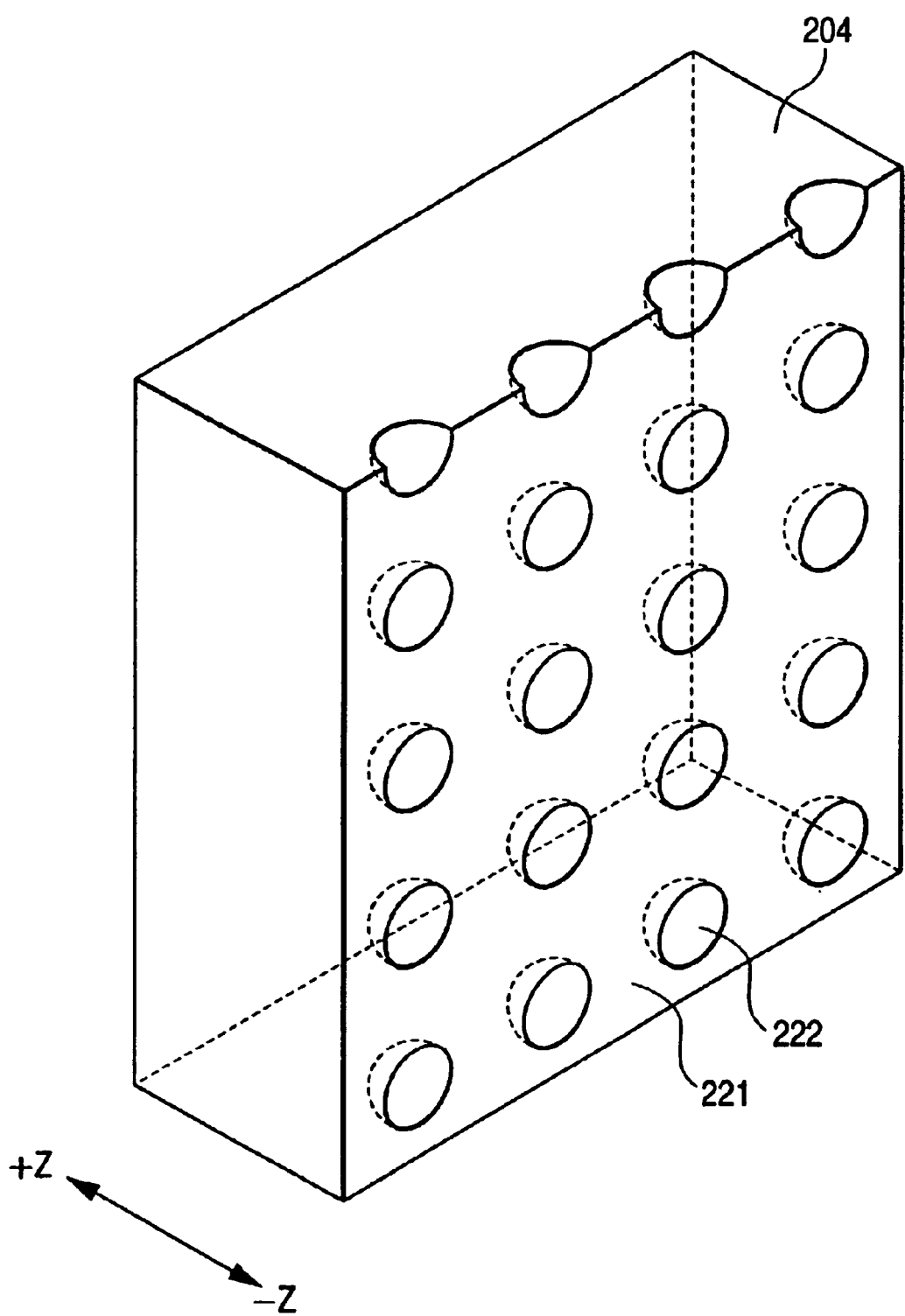
FIG. 19 is a diagram showing an example of a heat insulating member.
Figure 20:
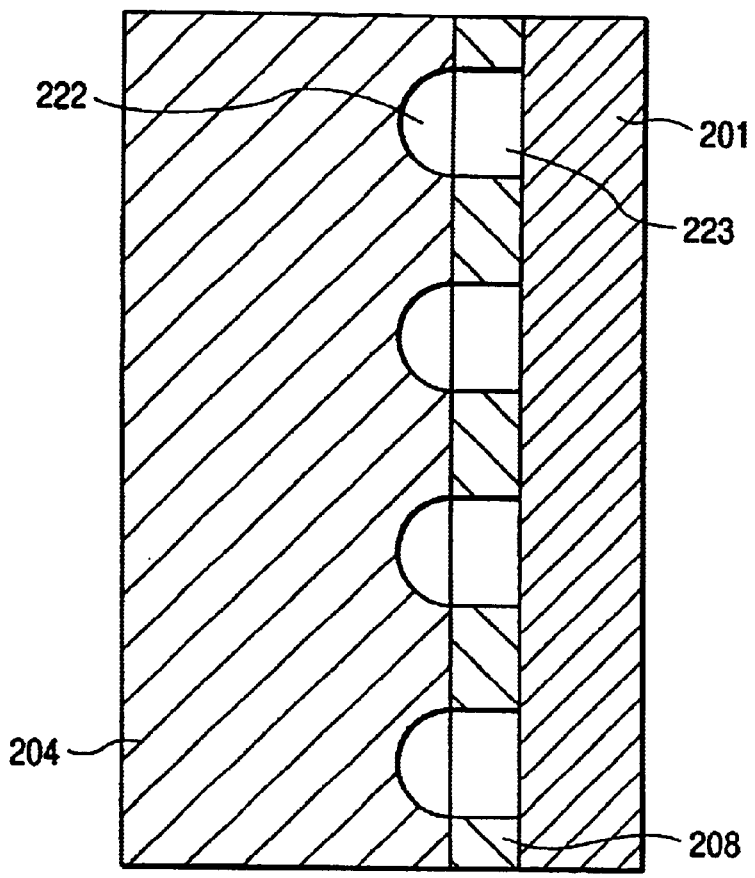
FIG. 20 is a diagram showing an example of a layout of the heat insulating member shown in FIG. 19.
Figure 21:
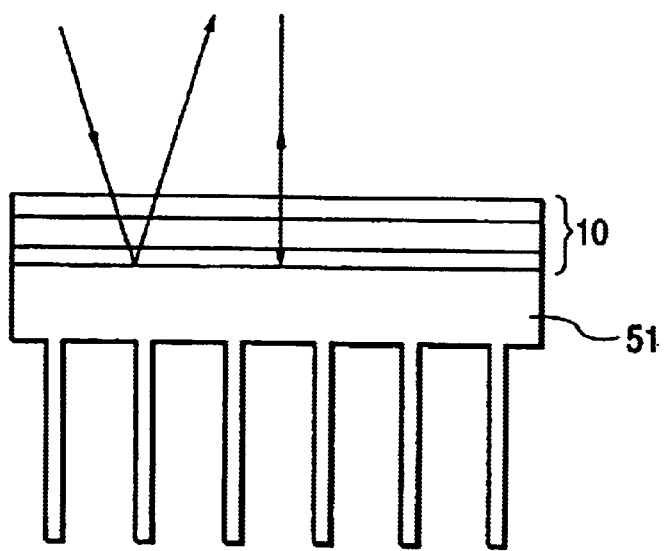
FIG. 21 is a diagram showing a conventional image forming apparatus with a heat dissipation fin.
Figure 22B:
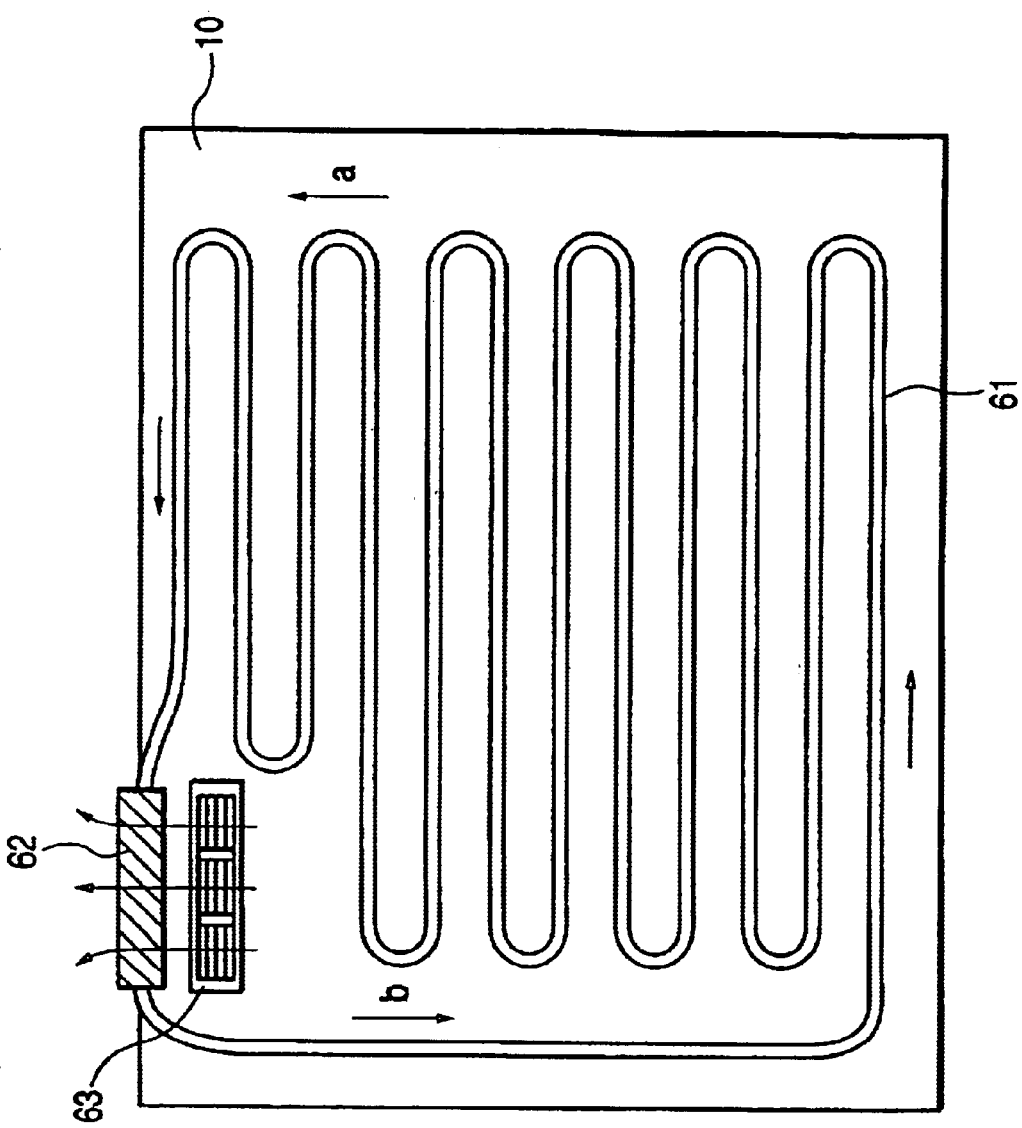
FIGS. 22A and 22B are diagrams showing a conventional image forming apparatus utilizing coolant.
Figure 22A:
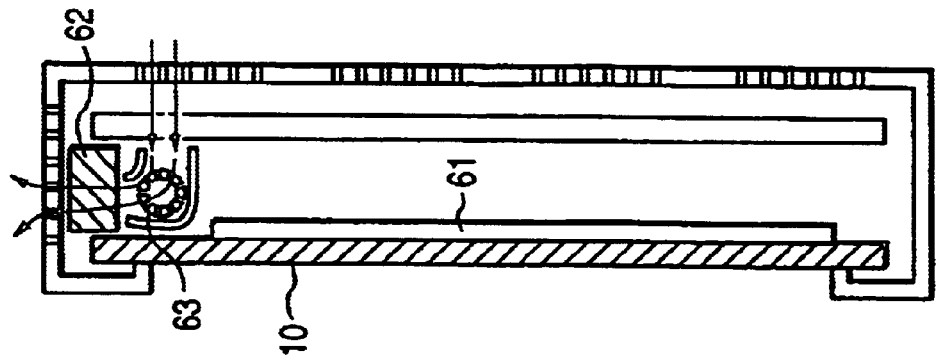
Figure 23:
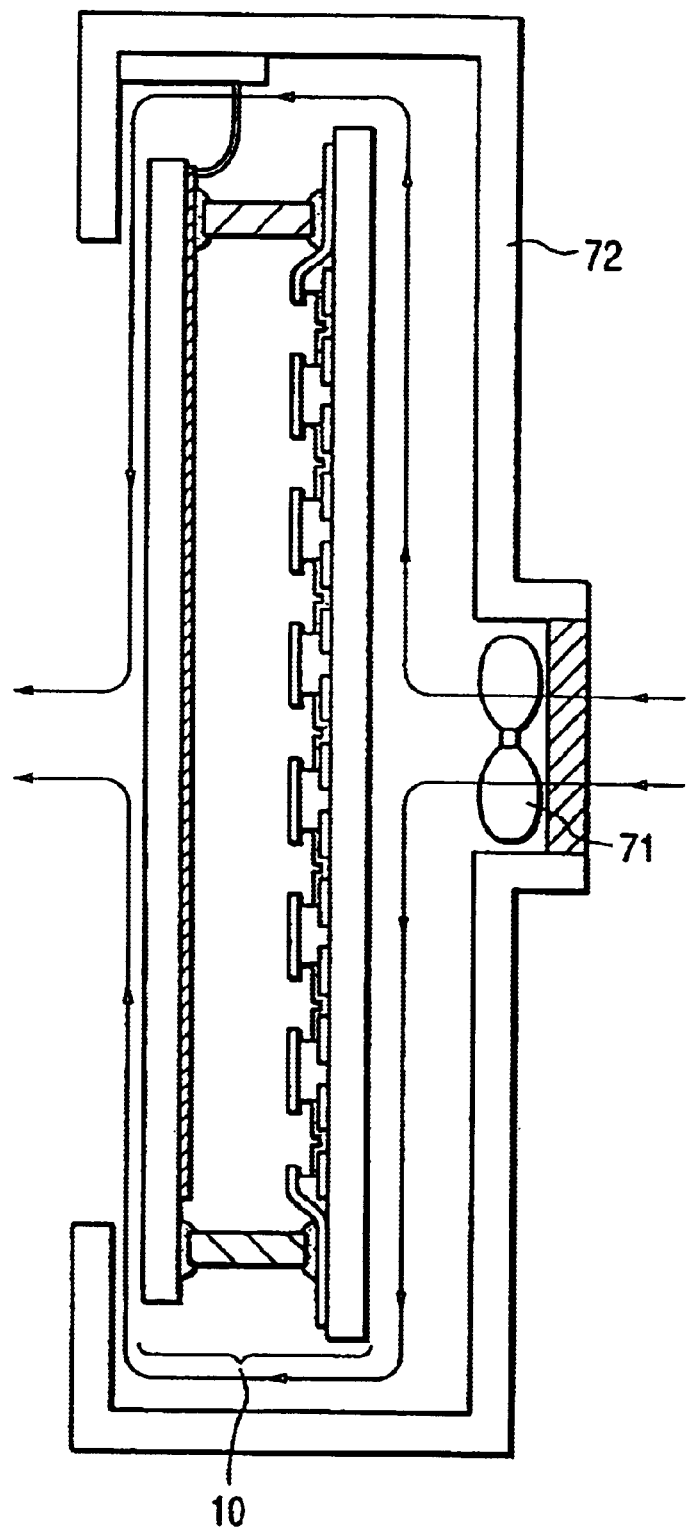
FIG. 23 is a diagram showing a conventional image forming apparatus with a fan.

FIG. 19 is an enlarged perspective view showing a portion of the heat insulating member 204, and FIG. 20 is an enlarged cross sectional view thereof. In FIGS. 19 and 20, reference numeral 221 represents a surface of the heat insulating member 204 on the side (−Z direction) of the face plate 201, reference numeral 222 represents a semispherical adiabatic space formed in the surface layer of the heat insulating member 204, and reference numeral 223 represents a through hole formed in the front heat conducting member 208 at the position same as that of the adiabatic space. The diameter of the semispherical adiabatic space and that of the through hole 223 are the same. Reference numeral 201 represents the face plate.

For the assembly, the front heat conducting member 208 is adhered and fixed to the molded heat insulating member 204, with the adiabatic spaces 223 being aligned with the through holes 223, and the heat insulating member 204 with the front heat conductive member 208 is pressed against the face plate 201.

By spatially restricting a motion of air (thermal conductivity of 0.01 W/mK) in the adiabatic space 222, the heat insulating effect can be improved considerably.

Instead of the semispherical shape of the adiabatic space 222, a circular hole, a rectangular hole, a groove or the like may be used so long as the motion of air which provides the heat insulating effect can be spatially restricted.

If the work cost of the through holes 223 to be formed in the front heat conducting member 208 becomes high or if a manufacture yield is lowered because of a positioning failure of the through holes 223 and adiabatic spaces 222 at the assembly stage, then the effects of the through holes 223 are not utilized satisfactorily and it is preferable not to form through holes from the viewpoint of manufacture cost.

According to the present invention, it is possible to provide an image forming apparatus having the structure capable of efficiently dissipating heat not suitable for the apparatus.

Further, according to the present invention, it is possible to provide an image forming apparatus having the structure capable of making uniform the distribution of temperature in the whole of an envelope (display panel) as much as possible.

Furthermore, according to the present invention, it is possible to provide an image forming apparatus capable of forming an image having a higher quality.

What is claimed is:

1. An image forming apparatus comprising:
   an envelope including first and second substrates and a frame disposed between said first and second substrates and forming a clearance therebetween;
   image forming means disposed between said first and second substrates within said envelop, said image forming means including an electron emitting device disposed on said first substrate and an image forming member disposed on said second substrate, said image forming member forming an image responsive to an irradiation with an electron emitted from said electron emitting device; and
   a heat insulating member for suppressing a thermal leakage, said insulating member disposed on an outer surface of said envelope, including surfaces of said frame and said first substrate, and a surface of said second substrate except for a surface region on which said image forming means is arranged, wherein a quantity of heat generated by said second substrate during operation of said image forming apparatus is greater than that of said first substrate.

2. An image forming apparatus comprising:
   an envelope including first and second substrates and a frame disposed between said first and second substrates and forming a clearance therebetween;
   image forming means disposed between said first and second substrates within said envelope, said image forming means including an electron emitting device disposed on said first substrate and an image forming member disposed on said second substrate, said image forming member forming an image responsive to an irradiation with an electron emitted from said electron emitting device; and
   a heat insulating member for suppressing a thermal leakage, said member disposed on an outer surface of said envelope, including surfaces of said frame and said first and second substrates except for a surface region of said image forming means on both of said first and second substrates.

3. An image forming apparatus according to claim 1, further comprising a heat conducting member disposed between an exterior surface of said envelope and said heat insulating member.

4. An image forming apparatus according to claim 2, further comprising a heat conducting member disposed between an exterior surface of said envelope and said heat insulating member.

5. An image forming apparatus according to claim 1, wherein said heat insulating member has a thermal conductivity smaller than said envelope.

6. An image forming apparatus according to claim 3, wherein said heat conducting member has a thermal conductivity larger than said envelope.

7. An image forming apparatus according to claim 4, wherein said heat conducting member has a thermal conductivity larger than said envelope.

8. An image forming apparatus according to claim 2, wherein said heat insulating member has a thermal conductivity smaller than said envelope.

9. An image forming apparatus comprising:
   an envelope including first and second substrates and a frame disposed between said first and second substrates and forming a clearance therebetween;
   image forming means disposed between said first and second substrates within said envelope, said image forming means including an electron emitting device disposed on said first substrate and an image forming member disposed on said second substrate, said image forming member forming an image responsive to an irradiation with an electron emitted from said electron emitting device; and a heat insulating member for suppressing a thermal leakage, said insulating member disposed on an outer surface of said envelope, including surfaces of said frame and said second substrate, and a surface of said first substrate except for a surface region on which said electron emitting device are arranged, wherein a quantity of heat generated by said first substrate during an operation of said image forming apparatus is greater than that of said second substrate.

10. An image forming apparatus according to claim 9, further comprising a heat conducting member disposed between an exterior surface of said envelope and said heat insulating member.

11. An image forming apparatus according to claim 9, wherein said heat insulating member has a thermal conductivity smaller than said envelope.

12. An image forming apparatus according to claim 10, wherein said heat conducting member has a thermal conductivity larger than said envelope.

* * * * *

UNITED STATES PATENT AND TRADEMARK OFFICE
CERTIFICATE OF CORRECTION

PATENT NO. : 6,737,790 B2
DATED : May 18, 2004
INVENTOR(S) : Junichi Seki

It is certified that error appears in the above-identified patent and that said Letters Patent is hereby corrected as shown below:

Title page,
Item [*] Notice, insert the following paragraph:
-- This patent issued on a continued prosecution application filed under 37 CFR 1.53(d), and its subject to the twenty year patent term provisions of 35 U.S.C. 154(a)(2). --.
Item [56], References Cited, FOREIGN PATENT DOCUMENTS, "11119666 A" should read -- 11-119666 --.

Column 3,
Line 52, "referent" should read -- reference --.

Column 14,
Line 7, "envelop," should read -- envelope, --.

Column 15,
Line 12, "are" should read -- is --.

Signed and Sealed this

Nineteenth Day of April, 2005

JON W. DUDAS
*Director of the United States Patent and Trademark Office*